United States Patent
Lee et al.

(10) Patent No.: US 10,775,904 B2
(45) Date of Patent: Sep. 15, 2020

(54) INPUT DEVICE AND ELECTRONIC DEVICE INCLUDING THE SAME

(71) Applicant: Samsung Electronics Co., Ltd., Gyeonggi-do (KR)

(72) Inventors: Kyongho Lee, Gyeonggi-do (KR); Kyuhong Kim, Gyeonggi-do (KR); Juwan Park, Gyeonggi-do (KR); Changbyung Park, Gyeonggi-do (KR); Kwangho Shin, Gyeonggi-do (KR); Jongwu Baek, Gyeonggi-do (KR); HyunSuk Choi, Gyeonggi-do (KR)

(73) Assignee: Samsung Electronics Co., Ltd., Yeongtong, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/426,194

(22) Filed: May 30, 2019

(65) Prior Publication Data
US 2019/0377430 A1 Dec. 12, 2019

(30) Foreign Application Priority Data
Jun. 11, 2018 (KR) .................. 10-2018-0066789

(51) Int. Cl.
*G06F 3/0354* (2013.01)
*G06F 3/041* (2006.01)
(Continued)

(52) U.S. Cl.
CPC ........ *G06F 3/03545* (2013.01); *G06F 3/0383* (2013.01); *G06F 3/046* (2013.01); *G06F 3/04162* (2019.05); *H02J 7/00* (2013.01)

(58) Field of Classification Search
CPC ........ G06F 3/03545–03546; G06F 2200/1632; G06F 1/1679; G06F 1/1616;
(Continued)

(56) References Cited

U.S. PATENT DOCUMENTS

| 5,889,512 A | 3/1999 | Moller et al. |
| 7,374,359 B1 | 5/2008 | Annerino et al. |

(Continued)

FOREIGN PATENT DOCUMENTS

| KR | 10-2015-0016684 A | 2/2015 |
| KR | 10-2017-0019084 A | 2/2017 |

(Continued)

OTHER PUBLICATIONS

International Search Report dated Aug. 27, 2019.

*Primary Examiner* — Sanjiv D. Patel
(74) *Attorney, Agent, or Firm* — Cha & Reiter, LLC.

(57) ABSTRACT

According to an embodiment, an input device of an electronic device, comprising a guide tube extending in a direction, a shaft mounted to be able to linearly move back and forth in the direction inside the guide tube, a first cam member rotatably mounted on the shaft inside the guide tube, being guided by the guide tube to linearly move along with the shaft in a first interval, and configured to rotate or linearly move about the shaft in a first position off the first interval to at least partially reenter into the first interval, a second cam member rotatably mounted on the shaft inside the guide tube, configured to linearly move in each of the first interval and a second interval adjacent to the first interval and differing from the first interval, and configured rotate and move about the shaft in the first position, a third cam member mounted on the shaft while facing the first cam member with the second cam member disposed the first cam member and the second cam member, the third cam member inside the guide tube and configured to linearly move back and forth along with the shaft, and a sensor module proximate to the first cam member, wherein as the third cam member linearly moves back and forth, the first cam member linearly moves and the second cam member linearly moves, (Continued)

and wherein the sensor module is configured to detect, at least, the first cam member reaching the first position to produce a first input signal.

20 Claims, 21 Drawing Sheets

(51) Int. Cl.
*G06F 3/038* (2013.01)
*G06F 3/046* (2006.01)
*H02J 7/00* (2006.01)

(58) Field of Classification Search
CPC ..... G06F 1/1622; B43K 24/084; B43K 29/02; B43K 7/12; B43K 24/146; B43K 24/06; B43K 24/08; B43K 25/028; B43K 27/02; B43K 27/08; B43K 27/12; B43K 24/16
See application file for complete search history.

(56) References Cited

U.S. PATENT DOCUMENTS

| | | |
|---|---|---|
| 2007/0075987 A1 | 4/2007 | Liu |
| 2015/0035809 A1 | 2/2015 | Kim et al. |
| 2018/0217687 A1 | 8/2018 | Yoo et al. |

FOREIGN PATENT DOCUMENTS

| | | |
|---|---|---|
| WO | 2015/116074 A1 | 8/2015 |
| WO | 2017/026627 A1 | 2/2017 |

INPUT DEVICE AND ELECTRONIC DEVICE INCLUDING THE SAME

CROSS-REFERENCE TO RELATED APPLICATION(S)

This application is based on and claims priority under 35 U.S.C. 119 of Korean Patent Application No. 10-2018-0066789, filed on Jun. 11, 2018, in the Korean Intellectual Property Office, the disclosure of which is herein incorporated by reference in its entirety.

BACKGROUND

1. Field

Certain embodiments of the disclosure relate to input devices of electronic devices, e.g., input devices capable of handwriting entry, such as stylus pens.

2. Description of the Related Art

With smartphones, tablet PCs, or other portable electronic devices in wide use, various additional devices are being proposed which lead to more availability of electronic devices. For example, Bluetooth headsets are capable of simplified control (e.g., play and pause) of an electronic device while providing an environment that allows the user to conveniently hear sounds from the electronic device. Bluetooth speakers may output sounds of, e.g., multimedia files, played back on an electronic device while interworking with the electronic device and also enable simple manipulation of the electronic device as do Bluetooth headsets. Input devices, such as keyboards or mice, interworking with an electronic device based on wireless communication, e.g., Bluetooth, may enhance the limited input functionality of electronic devices. Stylus pens may provide a handwriting entry environment in association with a digitizer integrated with the touchscreen or display of an electronic device as well as regular touch entry.

Input devices, such as stylus pens, enable handwriting entry, thus giving the electronic device increased utility. However, it would be desirable to provide more functional expandability or enhancement in usability for electronic devices.

The above information is presented as background information only to assist with an understanding of the disclosure. No determination has been made, and no assertion is made, as to whether any of the above might be applicable as prior art with regard to the disclosure.

SUMMARY

According to an embodiment, an input device of an electronic device, comprising a guide tube extending in a direction, a shaft mounted to be able to linearly move back and forth in the direction inside the guide tube, a first cam member rotatably mounted on the shaft inside the guide tube, being guided by the guide tube to linearly move along with the shaft in a first interval, and configured to rotate or linearly move about the shaft in a first position off the first interval to at least partially reenter into the first interval, a second cam member rotatably mounted on the shaft inside the guide tube, configured to linearly move in each of the first interval and a second interval adjacent to the first interval and differing from the first interval, and configured rotate and move about the shaft in the first position, a third cam member mounted on the shaft while facing the first cam member with the second cam member disposed the first cam member and the second cam member, the third cam member inside the guide tube and configured to linearly move back and forth along with the shaft, and a sensor module proximate to the first cam member, wherein as the third cam member linearly moves back and forth, the first cam member linearly moves and the second cam member linearly moves, and wherein the sensor module is configured to detect, at least, the first cam member reaching the first position to produce a first input signal. Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Figure 1:
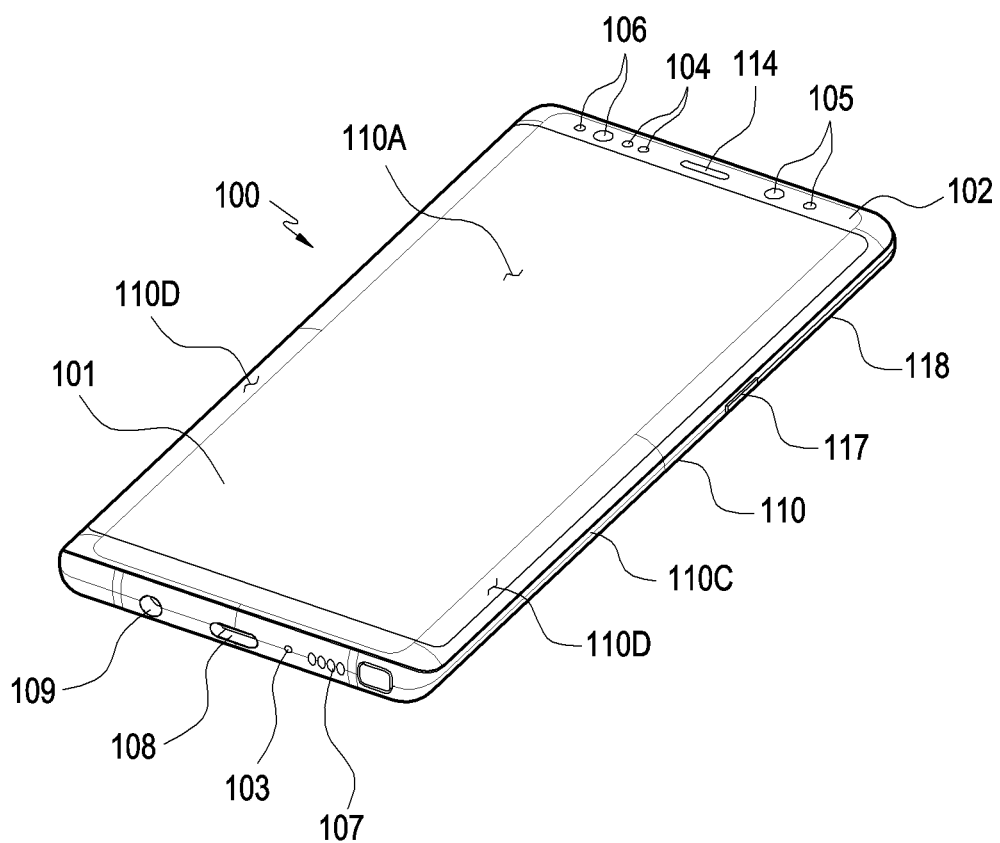
FIG. 1 is a front perspective view illustrating an electronic device according to an embodiment.

According to certain embodiments of the disclosure, there may be provided an input device easy to carry and capable of providing various input functions and an electronic device having the same.

According to certain embodiments of the disclosure, there may be provided an input device with more functional expandability and usability and an electronic device with the same.

Various changes may be made to the disclosure, and the disclosure may come with a diversity of embodiments. Some embodiments of the disclosure are shown and described in connection with the drawings. However, it should be appreciated that the disclosure is not limited to the embodiments and all changes and/or equivalents or replacements thereto also belong to the scope of the disclosure.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the disclosure. The term "and/or" may denote a combination(s) of a plurality of related items as listed or any of the items.

It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The terms "front," "rear surface," "upper surface," and "lower surface" are relative ones that may be varied depending on directions in which the figures are viewed, and may be replaced with ordinal numbers such as "first" and "second." The order denoted by the ordinal numbers, first and second, may be varied as necessary.

The terms as used herein are provided merely to describe some embodiments thereof, but not to limit the disclosure. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "electronic device" may be any device with a touch panel, and the electronic device may also be referred to as a terminal, a portable terminal, a mobile terminal, a communication terminal, a portable communication terminal, a portable mobile terminal, or a display apparatus.

For example, the electronic device may be a smartphone, a mobile phone, a navigation device, a game device, a TV, a head unit for vehicles, a laptop computer, a tablet computer, a personal media player (PMP), or a personal digital assistant (PDA). The electronic device may be implemented as a pocket-sized portable communication terminal with a radio communication function. According to an embodiment of the disclosure, the electronic device may be a flexible device or a flexible display.

The electronic device may communicate with an external electronic device, e.g., a server, or may perform tasks by interworking with such an external electronic device. For example, the electronic device may transmit an image captured by a camera and/or location information detected by a sensor to a server through a network. The network may include, but is not limited to, a mobile or cellular communication network, a local area network (LAN), a wireless local area network (WLAN), a wide area network (WAN), the Internet, or a small area network (SAN).

Figure 2:
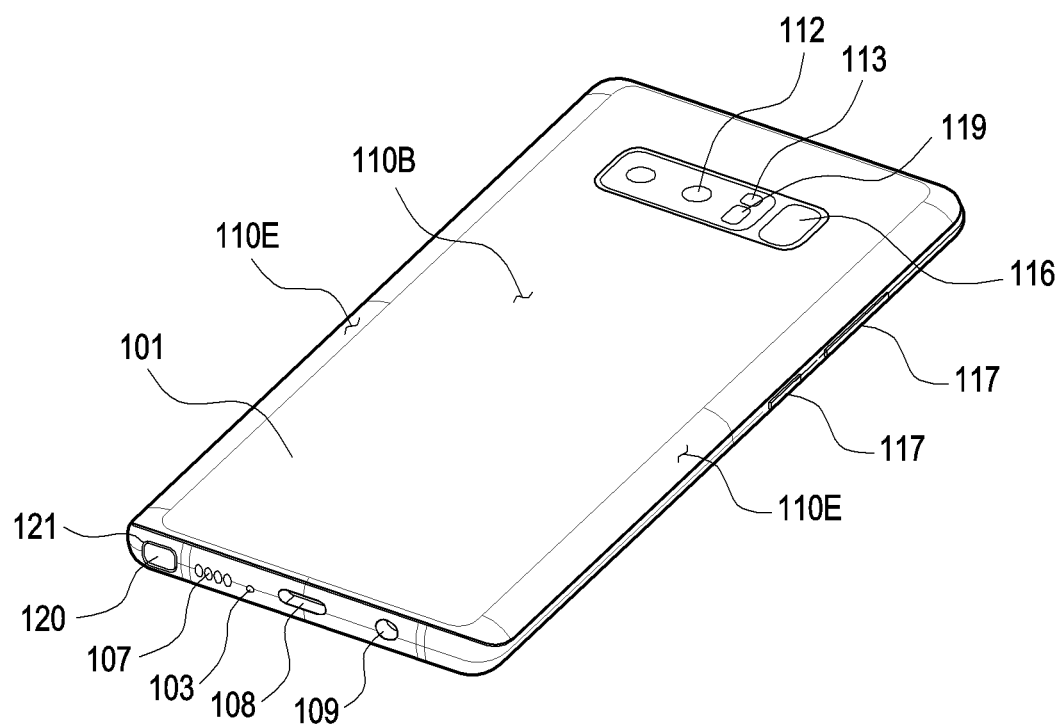
FIG. 2 is a rear perspective view illustrating the electronic device of FIG. 1.

FIG. 1 is a front perspective view illustrating an electronic device 100 according to an embodiment. FIG. 2 is a rear perspective view illustrating the electronic device 100 of FIG. 1.

The electronic device 100 includes an input device disposed in hole 120. The input device includes a guide tube with a shaft, such as a pen input device 120. Accordingly, the electronic device 100 housing for the pen input device 120, alleviating the user from having to carry it.

Electronic Device

Referring to FIGS. 1 and 2, according to an embodiment, an electronic device 100 may include a housing 110 with a first (or front) surface 110A, a second (or rear) surface 110B, and a side surface 110C surrounding a space between the first surface 110A and the second surface 110B. According to another embodiment (not shown), the housing may denote a structure forming part of the first surface 110A, the second surface 110B, and the side surface 110C of FIG. 1. According to an embodiment, at least part of the first surface 110A may have a substantially transparent front plate 102 (e.g., a glass plate or polymer plate including various coat layers). The second surface 110B may be formed of a substantially opaque rear plate 111. The rear plate 111 may be formed of, e.g., laminated or colored glass, ceramic, polymer, metal (e.g., aluminum, stainless steel (STS), or magnesium), or a combination of at least two thereof. The side surface 110C may be formed by a side bezel structure (or a "side member") 118 that couples to the front plate 102 and the rear plate 111 and includes a metal and/or polymer. According to an embodiment, the rear plate 111 and the side bezel plate 118 may be integrally formed together and include the same material (e.g., a metal, such as aluminum).

In the embodiment illustrated, the front plate 102 may include two first regions 110D, which is seamlessly bent from the first surface 110A to the rear plate 111, on both the long edges of the front plate 102. In the embodiment (refer to FIG. 2) illustrated, the rear plate 111 may include second regions 110E, which is seamlessly bent from the second surface 110B to the front plate 102, on both the long edges. According to an embodiment, the front plate 102 (or the rear plate 111) may include only one of the first regions 110D (or the second regions 110E). Alternatively, the first regions 110D or the second regions 110E may partially be excluded. According to an embodiment, at side view of the electronic device 100, the side bezel structure 118 may have a first thickness (or width) for sides that do not have the first regions 110D or the second regions 110E and a second thickness, which is smaller than the first thickness, for sides that have the first regions 110D or the second regions 110E.

According to an embodiment, the electronic device 100 may include at least one of a display 101, audio modules 103, 107, and 114, sensor modules 104, 116, and 119, camera modules 105, 112, and 113, key input devices 117, a light emitting device 106, a pen input device 120, and connector holes 108 and 109. According to an embodiment, the electronic device 100 may exclude at least one (e.g., the key input device 117 or the light emitting device 106) of the components or may add other components.

The display 101 may be exposed through the top of, e.g., the front plate 102. According to an embodiment, at least a portion of the display 101 may be exposed through the front plate 102 forming the first surface 110A and the first regions 110D of the side surface 110C. According to an embodiment, the edge of the display 101 may be formed to be substantially the same in shape as an adjacent outer edge of the front plate 102. According to an embodiment (not shown), the interval between the outer edge of the display 101 and the outer edge of the front plate 102 may remain substantially even to give a larger area of exposure the display 101. In certain embodiments, the display 101 can be capable of receiving touch inputs or inputs from a input device 120.

According to an embodiment (not shown), the screen display region of the display 101 may have a recess or opening in a portion thereof, and at least one or more of the audio module 114, sensor module 104, camera module 105, and light emitting device 106 may be aligned with the recess or opening. According to an embodiment (not shown), at least one or more of the audio module 114, sensor module 104, camera module 105, fingerprint sensor 116, and light emitting device 106 may be included on the rear surface of the screen display region of the display 101. According to an embodiment (not shown), the display 101 may be disposed to be coupled with, or adjacent, a touch detecting circuit, a pressure sensor capable of measuring the strength (pressure) of touches, and/or a digitizer for detecting a magnetic field-type stylus pen. According to an embodiment, at least part of the sensor modules 104 and 119 and/or at least part of the key input device 117 may be disposed in the first regions 110D and/or the second regions 110E.

The audio modules 103, 107, and 114 may include a microphone hole 103 and speaker holes 107 and 114. The microphone hole 103 may have a microphone inside to obtain external sounds. According to an embodiment, there may be a plurality of microphones to be able to detect the direction of a sound. The speaker holes 107 and 114 may include an external speaker hole 107 and a phone receiver hole 114. According to an embodiment, the speaker holes 107 and 114 and the microphone hole 103 may be implemented as a single hole, or speakers may be rested without the speaker holes 107 and 114 (e.g., piezo speakers).

The sensor modules 104, 116, and 119 may generate an electrical signal or data value corresponding to an internal operating state or external environmental state of the electronic device 100. The sensor modules 104, 116, and 119 may include a first sensor module 104 (e.g., a proximity sensor) and/or a second sensor module (not shown) (e.g., a fingerprint sensor) disposed on the first surface 110A of the housing 110 and/or a third sensor module 119 (e.g., a heart-rate monitor (FIRM) sensor) and/or a fourth sensor module 116 (e.g., a fingerprint sensor) disposed on the second surface 110B of the housing 110. The fingerprint sensor may be disposed on the second surface 110B as well as on the first surface 110A (e.g., the display 101) of the housing 110. The electronic device 100 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 104.

The camera modules 105, 112, and 113 may include a first camera device 105 disposed on the first surface 110A of the electronic device 100, and a second camera device 112 and/or a flash 113 disposed on the second surface 110B. The camera modules 105 and 112 may include one or more lenses, an image sensor, and/or an image signal processor. The flash 113 may include, e.g., a light emitting diode (LED) or a xenon lamp. According to an embodiment, two or more lenses (an infrared (IR) camera, a wide-angle lens, and a telescopic lens) and image sensors may be disposed on one surface of the electronic device 100.

The key input device 117 may be disposed on the side surface 110C of the housing 110. According to an embodiment, the electronic device 100 may exclude all or some of the above-mentioned key input devices 117 and the excluded key input devices 117 may be implemented in other forms, e.g., as soft keys, on the display 101. According to an embodiment, the key input device may include the sensor module 116 disposed on the second surface 110B of the housing 110.

The light emitting device 106 may be disposed on, e.g., the first surface 110A of the housing 110. The light emitting device 106 may provide, e.g., information about the state of the electronic device 100 in the form of light. According to an embodiment, the light emitting device 106 may provide a light source that interacts with, e.g., the camera module 105. The light emitting device 106 may include, e.g., a light emitting device (LED), an infrared (IR) LED, or a xenon lamp.

The connector holes 108 and 109 may include a first connector hole 108 for receiving a connector (e.g., a universal serial bus (USB) connector) for transmitting or receiving power and/or data to/from an external electronic device and/or a second connector hole 109 (e.g., an earphone jack) for receiving a connector for transmitting or receiving audio signals to/from the external electronic device.

Figure 3:
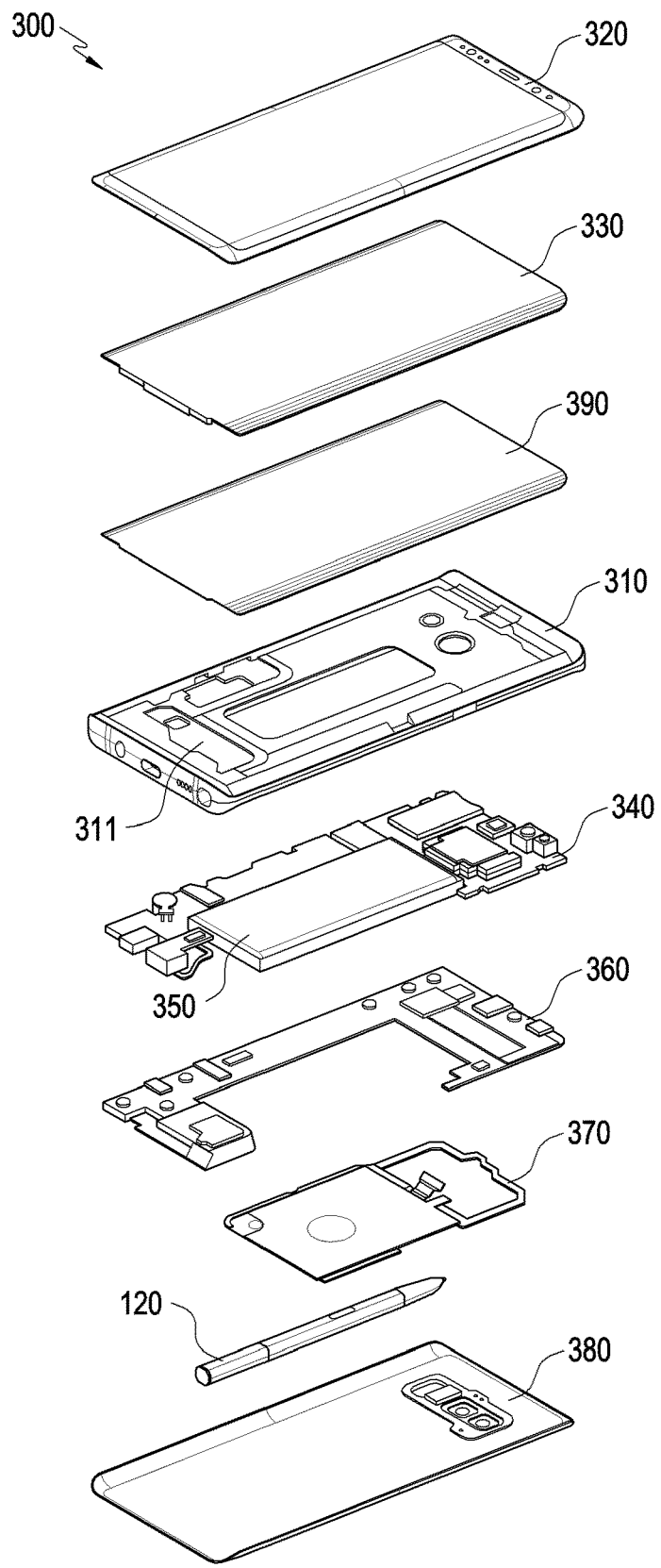
FIG. 3 is an exploded perspective view illustrating the electronic device of FIG. 1.

FIG. 3 is an exploded perspective view illustrating the electronic device of FIG. 1.

Referring to FIG. 3, an electronic device 300 (e.g., the electronic device 100 of FIG. 1) may include a side bezel structure 310, a first supporting member 311 (e.g., a bracket), a front plate 320, a display 330, an electromagnetic induction panel 390, a printed circuit board 340, a battery 350, a second supporting member 360 (e.g., a rear case), an antenna 370, a pen input device 120 (which will be described below), and a rear plate 380. According to an embodiment, the electronic device 300 may exclude at least one (e.g., the first supporting member 311 or the second supporting member 360) of the components or may add other components. At least one of the components of the electronic device 300 may be the same or similar to at least one of the components of the electronic device 100 of FIG. 1 or 2 and no duplicate description is made below.

The electromagnetic induction panel 390 (e.g., a digitizer) may be a panel for detecting input by the pen input device 120. For example, the electromagnetic induction panel 390 may include a printed circuit board (PCB) (e.g., a flexible PCB (FPCB)) and a shielding sheet. The shielding sheet may prevent inter-component interference by an electromagnetic field produced from the components (e.g., the display module, PCB, or electromagnetic induction panel) included in the electronic device 300. The shielding sheet may shield off electromagnetic fields produced from the components, thereby allowing an input from the pen input device 120 to be precisely delivered to the coil included in the electromagnetic induction panel 390. According to an embodiment, the electromagnetic induction panel 390 may include an opening formed in at least a portion corresponding to the biometric sensor embedded in the electronic device 300.

The first supporting member 311 may be disposed inside the electronic device 300 to be connected with the side bezel structure 310 or integrated with the side bezel structure 310. The first supporting member 311 may be formed of, e.g., a metal and/or non-metallic material (e.g., polymer). The display 330 may be joined onto one surface of the first supporting member 311, and the printed circuit board 340 may be joined onto the opposite surface of the first supporting member 311. A processor, memory, and/or interface may be mounted on the printed circuit board 340. The processor may include one or more of, e.g., a central processing unit, an application processor, a graphic processing device, an image signal processor, a sensor hub processor, or a communication processor.

The memory may include, e.g., a volatile or non-volatile memory.

The interface may include, e.g., a high definition multimedia interface (HDMI), a universal serial bus (USB) interface, a secure digital (SD) card interface, and/or an audio interface. The interface may electrically or physically connect, e.g., the electronic device 300 with an external electronic device and may include a USB connector, an SD card/multimedia card (MMC) connector, or an audio connector.

The battery 350 may be a device for supplying power to at least one component of the electronic device 300. The battery 189 may include, e.g., a primary cell which is not rechargeable, a secondary cell which is rechargeable, or a fuel cell. At least a portion of the battery 350 may be disposed on substantially the same plane as the printed circuit board 340. The battery 350 may be integrally or detachably disposed inside the electronic device 300.

The antenna 370 may be disposed between the rear plate 380 and the battery 350. The antenna 370 may include, e.g., a near-field communication (NFC) antenna, a wireless charging antenna, and/or a magnetic secure transmission (MST) antenna. The antenna 370 may perform short-range communication with, e.g., an external device or may wirelessly transmit or receive power necessary for charging. According to an embodiment of the disclosure, an antenna structure may be formed by a portion or combination of the side bezel structure 310 and/or the first supporting member 311.

Pen Input Device

The electronic device 100 forms a housing for the pen input device 120. The pen input device 120 (e.g., a stylus pen) may be guided and detachably inserted through a hole 121 formed in a side surface of the housing 110 into the inside of the housing 110. The pen input device 120 may include a button (e.g., a button member 453 of FIG. 8) for easy detachment. A separate resonance circuit (e.g., an electromagnetic resonance circuit 702 of FIG. 7) may be embedded in the pen input device 120 to interwork with an electromagnetic induction panel (e.g., an electromagnetic induction panel 390 of FIG. 3) (e.g., a digitizer) included in the electronic device 100. The pen input device 120 may come in, e.g., an electro-magnetic resonance (EMR), active electrical stylus (AES), or electric coupled resonance (ECR) scheme. The pen input device 120 can be used as an input device on the screen 102 by making contact therewith.

Figure 4:
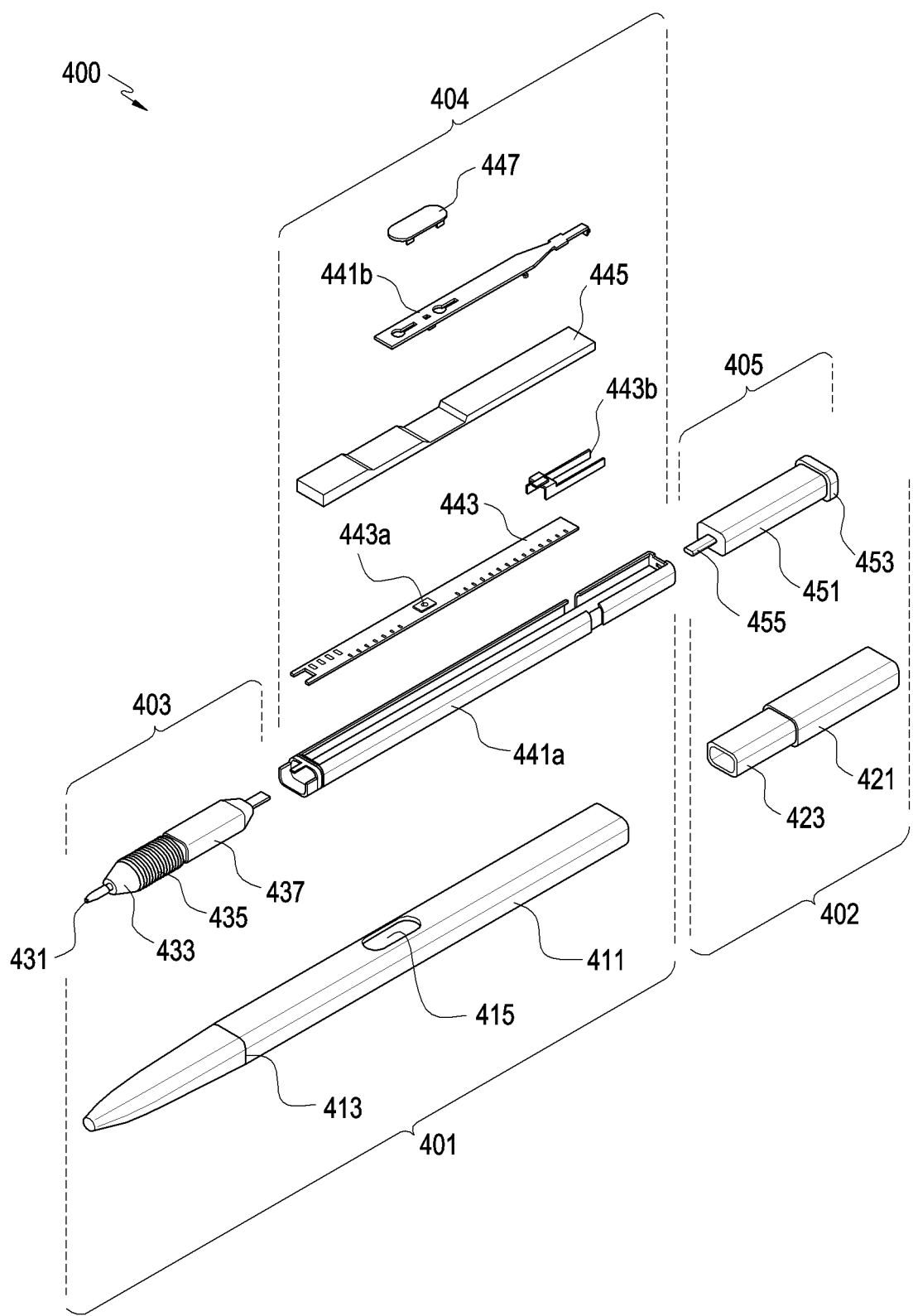
FIG. 4 is an exploded perspective view illustrating an input device of an electronic device according to an embodiment.

FIG. 4 is an exploded perspective view illustrating an input device of an electronic device 400 according to an embodiment.

Referring to FIG. 4, according to an embodiment, an input device 400 (e.g., the pen input device 120 of FIG. 2 or 3) may include a first body portion 401 and a second body portion 402. According to an embodiment, one end of the second body portion 402 may be coupled to one end of the first body portion 401, and the input device 400 may be shaped substantially as a rod extending along one direction. The first body portion 401 may receive various electric components (e.g., a coil unit 403 or a circuit board unit 404). The second body portion 402 may receive mechanical parts (e.g., a push-eject mechanism 405).

The input device 400 may be part of the input device of the electronic device 100 or 300 described above in connection with FIGS. 1 to 3. For example, the input device 400 may be the pen input device 120 of FIG. 3.

For example, the input device 400 may be received inside the electronic device via the same or similar structure (e.g., a receiving hole) to the hole 121 of FIG. 2. According to an embodiment, the electrical circuits received in the first body portion 401 may include an electromagnetic resonance circuit (e.g., the resonance unit 702 of FIG. 7), thereby being able to interwork with a digitizer, e.g., the electromagnetic induction panel 390 of FIG. 3. According to an embodiment, the mechanical parts received in the second body portion 402 may provide a push-eject type button structure (wherein a first press results in the button remaining depressed after the pressure is withdrawn, and a second press results in the button reverting to un-pressed/ejected when the pressure is withdrawn), and the input device 400 may generate input signals based on the operation of the button structure.

According to an embodiment, the first body portion 401 may include a tube body 411, a coil unit 403, and a circuit board unit 404. The tube body 411 may substantially form at least part of the outer appearance of the first body portion 401 or the input device 400 and be formed of a hollow tube to provide a space to receive the coil unit 403 and/or the circuit board unit 404. According to an embodiment, the tube body 411 may include a lock hole 413 or an opening 415. The lock hole 413 may provide a means to fasten, e.g., the coil unit 403 inside the tube body 411. For example, the coil unit 403 may include a protrusion 431 (acting as the ball point of a pen) corresponding to the lock hole 413 and, when the coil unit 403 is received inside the tube body 411, the lock hole 413 and the protrusion (not shown) are fitted together to fasten the coil unit 403 to the inside of the tube body 411. The opening 415 may provide a space for placing an operation key 447 (which can be mechanically pressed like a button) which is described below. For example, the operation key 447 may be placed in the opening 415 to be manipulated by the user and, as the operation key 447 is manipulated, the input device 400 may produce an input signal or electromagnetic field.

According to an embodiment, the coil unit 403 may include a pen tip 431, a sealing member 433, an electromagnetic coil 435, and/or a pen pressure sensing unit 437 and may be electrically connected with the circuit board unit 404 inside the tube body 411. The pen tip 431 may sequentially penetrate the sealing member 433 and the electromagnetic coil 435 and is then electrically or mechanically connected with the pen pressure sensing unit 437. As the coil unit 403 is coupled with the tube body 411, the pen tip 431 may be projected through an end of the tube body 411, and the sealing member 433 may be brought in tight contact with the inner wall of the end of the tube body 411, thereby forming a sealing structure. For example, the sealing member 433 may form a waterproof and dustproof structure, blocking a foreign body from coming into the inside of the tube body 411.

According to an embodiment, the electromagnetic coil 435 may a resonance frequency within a designated or preset frequency band (e.g., frequency band of 500 kHz) and may be combined with at least one lumped device (e.g., a capacitor) so that the resonance frequency produced by the electromagnetic coil 435 may be adjusted within a predetermined range. When combined with a plurality of capacitors, the electromagnetic coil 435 may produce a plurality of resonance frequencies (e.g., resonance frequencies of 530 kHz and 560 kHz). For example, the electromagnetic coil 435 and at least one capacitor may be combined together to form an electromagnetic resonance circuit (e.g., the resonance circuit unit 702 of FIG. 7). According to an embodiment, the electromagnetic coil 435 may produce a plurality of frequencies corresponding to the number of capacitors connected thereto. One of the plurality of resonance frequencies produced by the electromagnetic coil 435 may be used to detect a drag or drawing operation, and another may be used to detect a touch or click operation. For example, the user's input operation using the input device 400 may be mimicked through the coil unit 403 (or an electromagnetic field produced by the coil unit 403), and the digitizer (e.g., the electromagnetic induction panel 390 of FIG. 3) of the electronic device 100 or 300 may detect the electromagnetic field generated by the coil unit 403 or a movement of the electromagnetic field to thereby produce an input signal. There may be various resonance frequencies and various types of operations detected by resonance frequencies depending on the settings of the input device 400 or the electronic device (e.g., the electronic device 300 of FIG. 3) including the input device 400.

According to an embodiment, the pen pressure sensing unit 437 may include a variable capacitor. When an outer pressure is applied to the pen tip 431, e.g., when the pen tip 431 contacts the front plate 320 of FIG. 3, the capacitance of the pen pressure sensing unit 437 may be varied and, thus, the resonance frequency produced by the electromagnetic coil 435 may be shifted. For example, when the capacitance of the pen pressure sensing unit 437 is varied, the resonance frequency of 560 kHz produced by the electromagnetic coil 435 may be increased within a range of about 30 kHz.

According to an embodiment, the circuit board unit 404 may include a circuit board 443, a radiating conductor 443b, the operation key 447, and/or various structures to mount or fasten the circuit board 443. The circuit board 443 may have a flat shape with a top and bottom surface and be extended along one direction and be received inside the tube body 411. A variable capacitor (not shown) or a switching member 443a (e.g., a dome switch) connected with the electromagnetic coil 435 may be disposed on the top surface of the circuit board 443, and a battery (e.g., the battery 750 of FIG. 7), a charging circuit, a signal generating circuit, and/or a communication circuit may be disposed on the bottom surface of the circuit board 443. The communication circuit may perform wireless communication via the radiating conductor 443b. When wireless communication is performed through the radiating conductor 443b, the radiating conductor 443b in the input device 400 may be placed far enough from the coil unit 403 (e.g., as far as possible within a range that the internal space of the input device 400 or tube body 411 permits). The configuration of the battery, charging circuit, or other various circuit devices is described below in detail with reference to FIG. 7.

According to an embodiment, structures for mounting or fastening may include, e.g., a board holder 441a, a cover unit 445, and a key holder 441b. The circuit board 443 may be mounted inside the tube body 411 while being at least partially received in the board holder 441a, and the radiating conductor 443b may be mounted in the board holder 441a and be thus electrically connected to the circuit board 443. The board holder 441a may be inserted into the tube body 411 along the lengthwise direction, thus fastening the circuit board 443 to the inside of the tube body 411. According to an embodiment, the coil unit 403 in the tube body 411 may be electrically connected to the circuit board 443. The cover unit 445 may fasten or seal the circuit board 443 to the board holder 441a. For example, the cover unit 445 may fasten the circuit board 443 to the board holder 441a while closing a partial space of the board holder 441a. According to an embodiment, the radiating conductor 443b may remain electrically connected to or mechanically contacting the circuit board 443 by the cover unit 445. The key holder 441b may be fixed between the cover unit 445 and the inner wall of the tube body 411, supporting the operation key 447. According to an embodiment, the operation key 447 may be supported by the key holder 441b and be exposed through the opening 415. As the operation key 447 is manipulated, the key holder 441b or the cover unit 445 is deformed, allowing the switching member 443a to be manipulated. For example, the operation key 447 may be positioned corresponding to the switching member 443a. When no external force is applied to the operation key 447, the cover unit 445 or the key holder 441b may provide an elastic restoring force, allowing the operation key 447 to be restored to or remain in a predetermined position.

According to an embodiment, the circuit board unit 404 may include a sealing member 433, e.g., an O-ring. For example, although not denoted with any reference number, elastic O-rings may be placed at both ends of the board holder 441a, thereby forming a sealing structure between the board holder 441a and the tube body 411. According to an embodiment, the key holder 441b or the cover unit 445 may be partially brought in tight contact with the tube body 411 around the opening 415, thereby forming a sealing structure. For example, the circuit board unit 404 may also form a similar waterproof and dustproof structure with the sealing member 433 of the coil unit 403.

According to an embodiment, the second body portion 402 may include guide tubes 421 and 451 and a push-eject mechanism 405. The guide tubes 421 and 451 may include a first guide tube 421 coupled with the tube body 411 and a second guide tube 451 receiving a plurality of cam members. According to an embodiment, the first guide tube 421 and the second guide tube 451 each may extend along one direction, and the second guide tube 451 is inserted and mounted in the inside of the first guide tube 421, completing the guide tubes 421 and 451. However, it should be noted that embodiments of the disclosure are not limited thereto. For example, the first guide tube 421 and the second guide tube 451 may be formed or manufactured of substantially one body. Although the "first guide tube" and the "second guide tube" are described below as separated from each other, each may be termed simply as a "guide tube" for illustration purposes, and the first guide tube or second guide tube may be interchangeably denoted with reference number 421 or 451.

According to an embodiment, the first guide tube 421 may substantially form a portion of the outer appearance of the second body portion 402 or the input device 400 and have an insertion part 423 at one end thereof to enable coupling with the first body portion 401. For example, the insertion part 423 may be inserted to one end of the tube body 411, and the outer circumferential surface of the first guide tube 421, except for the insertion part 423, may be disposed to form substantially the same flat or curved surface with the outer circumferential surface of the tube body 411. According to an embodiment, the insertion part 423 may be coupled to wrap around a portion of the board holder 441a inside the tube body 411. For example, the insertion part 423 may be partially interposed between the inner wall of the tube body 411 and a portion of the outer circumferential surface of the board holder 441a. According to an embodiment, a hole corresponding to the insertion part 423 may be formed in a portion of the board holder 441a. For example, the insertion part 423 may partially be inserted into the board holder 441a inside the tube body 411.

According to an embodiment, the push-eject mechanism push-eject mechanism 405 may include the second guide tube 451, a button member 453, or a shaft 455. The shaft 455 may be installed to move back and forth along the direction in which the guide tube extends inside the second guide tube 451, with a portion thereof projected from one end of the second guide tube 451. A plurality of mechanical parts (not shown), e.g., cam members (e.g., the first, second, and third cam members 801, 802, and 803 of FIG. 8), or elastic members (e.g., the elastic members 551a and 851a of FIG. 8), may be arranged inside the second guide tube 451, thereby forming a push-eject structure. The push-eject structure is described below in detail with reference to FIG. 8. According to an embodiment, the button member 453 may be coupled with the shaft 455 inside the second guide tube 451 while being projected from the other end of the second guide tube 451. For example, the shaft 455 and the button member 453 may be coupled together inside the second guide tube 451, and a portion of the shaft 455 may be projected from one end of the second guide tube 451 while the button member 453 may be projected from the other end of the second guide tube 451. According to an embodiment, the button member 453, together with the shaft 455, may substantially move back and forth with respect to the second guide tube 451. According to an embodiment, the second guide tube 451 may be inserted into the inside of the first guide tube 421, and the button member 453 may be projected or exposed from one end of the second guide tube 451. For example, the button member 453 may partially form a portion of the outer appearance of the input device 400.

According to an embodiment, as the second body portion 402, e.g., the first guide tube 421, is coupled with the first body portion 401, one end of the shaft 455 may be placed inside the first body portion 401. For example, one end of the shaft 455 may be disposed more adjacent to the board holder 441a. The input device 400 may include a sensor module to detect a back-and-forth movement of the shaft 455, thereby generating an input signal. For example, the input device 400 may provide another independent input scheme from the input scheme using the coil unit 403.

The sensor module of the input device 400 is described below in detail with reference to FIGS. 5 and 6. In the following embodiments, the components similar to those in the above embodiments or easy to understand from the description of the above embodiments are denoted with or without the same reference numerals and their detailed description may be skipped.

Figure 5:
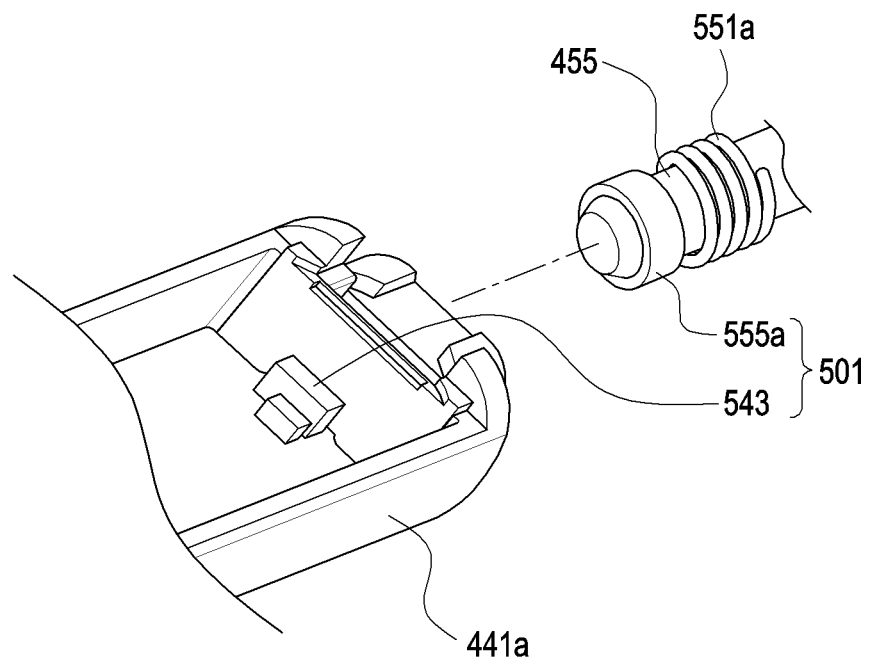
FIG. 5 is an exploded perspective view illustrating a configuration of a sensor module of an input device according to an embodiment.

FIG. 5 is an exploded perspective view illustrating a configuration of a sensor module 501 of an input device according to an embodiment. FIG. 6 is a plan view illustrating a portion of an input device according to an embodiment.

Figure 6:
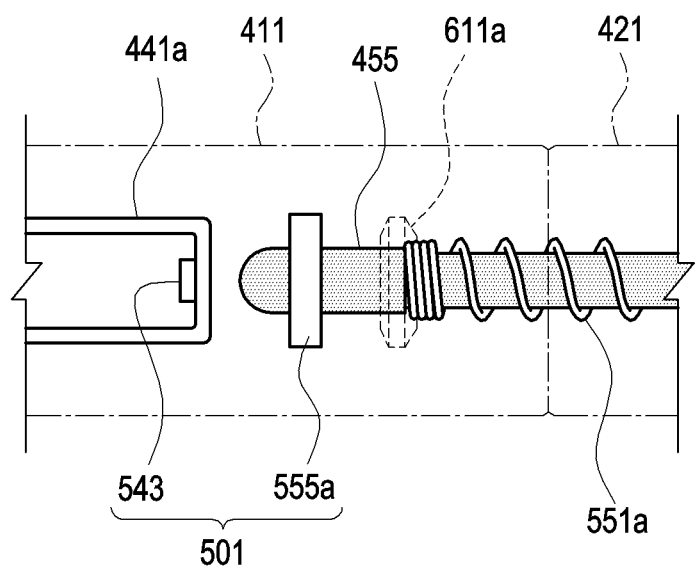
FIG. 6 is a view illustrating a portion of an input device according to an embodiment.

Referring to FIGS. 5 and 6, the input device 400 may include a sensor module 501. The sensor module 501 can comprise a hall sensor 543 and a magnet 555a. For example, the hall sensor 543 may be disposed on one end of the board holder 441a, and the magnet 555a may be mounted on an end of the shaft 455.

The sensor module 501 detects motion of the shaft 455 relative to the first guide tube 421. As the second body portion 402 is coupled with the first body portion 401, an end of the shaft 455 may be positioned substantially adjacent to or to partially overlap the board holder 441a. For example, the magnet 555a may be disposed adjacent to the hall sensor 543, and the hall sensor 543 may detect a variation in position or movement of a magnetic field according to a back-and-forth movement of the shaft 455 (e.g., a magnetic field produced by the magnet 555a), thereby producing an input signal. According to an embodiment, the input device 400 may include a first elastic member 551*a* (such as a spring). The sensor 501 may receive a restoration force of the first elastic member 551*a*. For example, the sensor 500 may move in the direction to allow the magnet 555*a* to approach the hall sensor 543 by an external force and, as the external force disappears, the magnet 555*a* may be moved away from the hall sensor 543 by an elastic force (e.g., restoration force) of the first elastic member 551*a*. According to an embodiment, at least one first supporting structure 611*a* may be formed inside the tube body 411, supporting one end of the first elastic member 551*a*. According to an embodiment, the structure to support the first elastic member 551*a* may be provided inside the second body portion 402, e.g., the second guide tube 451.

Thus, the sensor module 501 can detect when the user depresses the shaft 455 via button member 453. Depressing the button member 453 causes first elastic member 551*a* to compress and the shaft 455 to move the magnet 555*a* to proximate to the Hall sensor 543. When the magnet 555*a* moves closer to the Hall sensor 543, the Hall sensor 543 generates a signal indicating that the magnet 555*a* is close to the Hall sensor 543. When the user releases the shaft the elastic member 551*a* expands causing the shaft 455 and magnet 555*a* to move away from the Hall sensor 455. The magnet 555*a* moving away from the Hall sensor 455 causes the Hall sensor 455 to generate a signal indicating that the magnet 555*a* is no longer proximate to the Hall sensor 455.

Figure 7:
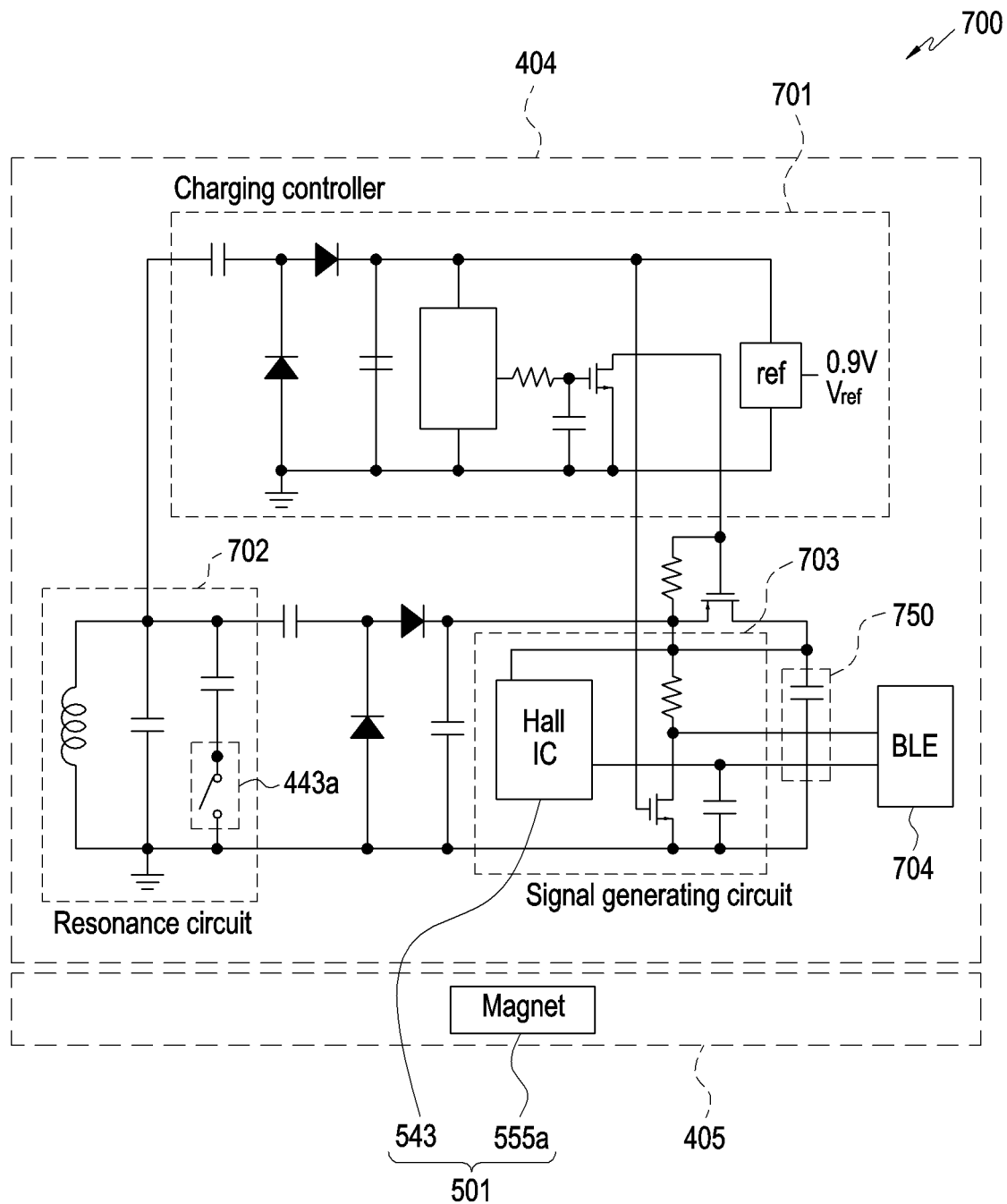
FIG. 7 is a circuit diagram illustrating an input device according to an embodiment.

FIG. 7 is a circuit diagram illustrating an input device 700 according to an embodiment.

Referring to FIG. 7, an input device 700 (e.g., the input device 400 of FIG. 4) may include a charging circuit unit 701, a resonance circuit unit 702, a signal generating circuit unit 703, a transceiver 704, or a battery 750 which forms at least part of a circuit board unit 404 (e.g., the circuit board unit 404 of FIG. 4). Although not shown, the input device 700 may include a controller or a memory, thereby storing or executing instructions to operate the input device 700.

According to an embodiment, the charging circuit unit 701 may charge the battery 750 with power received from the outside and detect the charging status of the battery 750 to selectively stop charging. According to an embodiment, power may be received via an electromagnetic coil (e.g., the electromagnetic coil 435 of FIG. 4) of the coil unit (e.g., the coil unit 403 of FIG. 4). For example, the charging circuit unit 701 may be positioned between the electromagnetic coil 435 and the battery 750 and may include voltage detector circuitry and a rectifier. According to an embodiment, while the input device 700 is received in an electronic device (e.g., the electronic device 300 of FIG. 3), the electronic device may transmit power to the input device 700 with e.g., the coil unit 403 in an electromagnetic coupling or electromagnetic resonance scheme.

According to an embodiment, the resonance circuit unit 702 may include a combination of at least one inductor or capacitor. For example, the resonance circuit unit 702 may be formed of a combination of at least one capacitor disposed on a circuit board (e.g., the circuit board 443 of FIG. 4) and an electromagnetic coil (e.g., the electromagnetic coil 435 of FIG. 4). The resonance circuit unit 702 may include a switch 443*a* (e.g., the switching member 443*a* of FIG. 4) and form different resonance frequencies depending on whether the switch 443*a* operates or not.

According to an embodiment, the signal generating circuit unit 703 may include, e.g., a Hall sensor (Hall IC) (e.g., the hall sensor 543 of FIG. 5), thereby producing an input signal based on a variation in or movement of an electromagnetic field. For example, the input device 700 may include a sensor module (e.g., the sensor module 501 of FIG. 5) which is formed of a combination of the hall sensor 543 and a magnet (e.g., the magnet 555*a* of FIG. 5) disposed in a push-eject mechanism (e.g., the push-eject mechanism 405 of FIG. 4), and the hall sensor 543 may detect a variation in or movement of a magnetic field produced by the magnet 555*a*. The signal generating circuit unit 703 may produce an input signal based on information detected through the hall sensor 543.

According to an embodiment, the transceiver 704 may include, e.g., Bluetooth Lower Energy (BLE) circuitry and may be electrically connected with the radiating conductor 443*b* of FIG. 4 to perform wireless communication. For example, an input signal produced from the signal generating circuit unit 703 may be transmitted through, e.g., the transceiver 704 or the radiating conductor 443*b* to the electronic device (e.g., the electronic device 300 of FIG. 3). The electronic device may perform various functions according to operation modes and/or based on signals transmitted from the transceiver 704.

According to an embodiment, the sensor module 501 may be replaced with a mechanical switching member, e.g., a dome switch or tact switch. For example, as a shaft (e.g., the shaft 455 of FIGS. 4 to 6) in the sensor module 501 linearly moves back and forth, the mechanical switching member may be operated and, as the mechanical switching member is turned on or off, the communication circuit unit (e.g., the transceiver 704 of FIG. 7) may transmit, e.g., the input signal via, e.g., the radiating conductor (e.g., the radiating conductor 443*b* of FIG. 4) to the electronic device (e.g., the electronic device 300 of FIG. 3).

According to an embodiment, the battery 750 may be formed of an electric double layered capacitor (EDLC). According to an embodiment, the resonance circuit unit 702 may be electrically connected with the transceiver 704 (e.g., BLE circuitry) and may monitor the voltage of the battery 750 through the transceiver 704.

Push-Eject Mechanism

Figure 8:
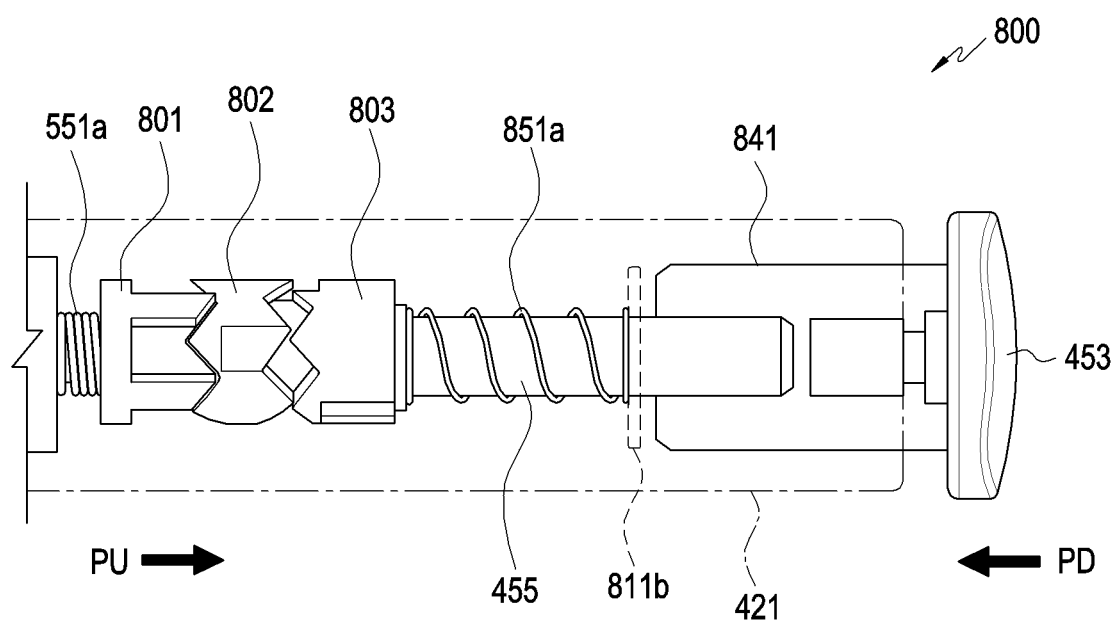
FIG. 8 is a view illustrating a push-eject mechanism of an input device according to an embodiment.

FIG. 8 is a view illustrating a push-eject mechanism 800 of an input device according to an embodiment. The push-eject mechanism includes first elastic member 551*a*, first cam member 801, second cam member 802, third cam member 803, second elastic member 851*a*, shaft 455, and button member 453. The push-eject mechanism causes the shaft 455 to either be in a pushed position or an ejected position.

Referring to FIG. 8, the push-eject mechanism 800 (e.g., the push-eject mechanism 405 of FIG. 4) may include the above-described guide tubes (e.g., the first guide tube 421 and second guide tube 451 of FIG. 4), the shaft 455, and the elastic members 551*a* and 851*a*. Multiple, e.g., three, cam members 801, 802, and 803 may be arranged inside the guide tubes. The guide tubes may be formed of a combination of the first guide tube 421 and the second guide tube 451 of the input device (e.g., the input device 400 of FIG. 4) as set forth above. According to an embodiment, FIG. 4 may be further referred to as necessary for the detailed description of the push-eject mechanism 800.

According to an embodiment, the shaft 455 and the button member 453 may be arranged to be able to linearly move back and forth inside the guide tubes, e.g., the first guide tube 421 and may receive an elastic force (e.g., restoration force) in the direction of projecting the button member 453 from one end of the first guide tube 421 (hereinafter, this direction is referred to as a "pop-up direction PU"). For example, the push-eject mechanism 800 may include a first elastic member (e.g., the first elastic member 551a of FIG. 5 or 6), thereby providing a restoration force to eject the shaft 455 or the button member 453 in the pop-up direction PU. According to an embodiment, a connecting member 841 may be provided inside the first guide tube 421, thereby connecting the shaft 455 with the button member 453. For example, the shaft 455 and the button member 453 may be combined with the connecting member 841 and may thus be linearly moved back and forth in substantially the same direction and the same interval. According to an embodiment, the connecting member 841 may be integrally extended from the button member 453. According to an embodiment, the connecting member 841 may be integrally extended from the shaft 455.

According to an embodiment, the input device 400 may further include a second elastic member 851a, thereby being able to provide an elastic force in the direction to allow the button member 453 to be inserted or enter into the inside of the first guide tube 421 (hereinafter, referred to as a "pop-down direction PD"). For example, a second supporting structure 811b may be formed inside the first guide tube 421 (or the second guide tube 451), and the second elastic member 851a may be supported by the second supporting structure 811b to thereby provide an elastic force to allow the button member 453 to be inserted or enter into the inside of the first guide tube 421. According to an embodiment, even when the button member 453 is fully inserted or entering into the first guide tube 421, a portion of the button member 453 may be exposed or projected to the outside of the first guide tube 421. For example, with the first guide tube 421 fully inserted or entering into the first guide tube 421, the button member 453 may form a portion of the outer appearance of the input device 400.

According to an embodiment, the input device 400 or the push-eject mechanism 800 may include three cam members 801, 802, and 803. For example, the push-eject mechanism 800 may include a first cam member 801 which is disposed on the shaft 455 and rotates or linearly moves back and forth with respect to the shaft 455, a second cam member 802 which is disposed on the shaft 455 and rotates or linearly moves back and forth with respect to the shaft 455, and/or a third cam member 803 which is mounted on the shaft 455 and, along with the shaft 455 (or the button member 453), linearly moves back and forth. According to an embodiment, the third cam member 803 may be disposed to face the first cam member 801, with the second cam member 802 disposed therebetween. For example, the first cam member 801, the second cam member 802, and the third cam member 803 may sequentially be arranged on the shaft 455, and the first cam member 801 and the second cam member 802 may be rotated or linearly moved with respect to the shaft 455.

According to an embodiment, the first elastic member 551a may press against the first cam member 801 to provide an elastic force to the first cam member 801 in the pop-up direction. The second elastic member 851a may press against the third cam member 803 to provide an elastic force to the third cam member 803 in the push-down direction. For example, the first elastic member 551a may provide an elastic force to the first cam member 801 in the pop-up direction PU at a more inside position than the second elastic member 851a is, e.g., in a position more adjacent to the first body portion (e.g., the first body portion 401 of FIG. 4), and the second elastic member 851a may provide an elastic force to the third cam member 803 in the push-down direction PD on an outside, e.g., in a position adjacent to the button member 453. The first cam member 801, the second cam member 802, and/or the third cam member 803 may be kept in tight contact with each other by the elastic forces of the first elastic member 551a and the second elastic member 851a. According to an embodiment, the elastic force of the first elastic member 551a may be larger than the elastic force of the second elastic member 851a. For example, when no external force is applied, the combined forces of the first elastic member 551a and the second elastic member 851a may be exerted in the pop-up direction PU.

According to an embodiment, the cam members 801, 802, and 803 each may be guided by a guide structure (e.g., the guide structure 905 of FIG. 9) provided in the guide tube, e.g., the second guide tube 451, to be linearly moved back and forth in a predetermined interval. According to an embodiment, the first cam member 801 and the second cam member 802 may be guided by the guide structure 905 within the intervals permitted therefor and be linearly moved back and forth along with the shaft 455 and, when escaping from the linear motion intervals, at least partially reenter into the linear back-and-forth motion interval while rotating about the shaft 455. According to an embodiment, the guide structure 905 in the guide tube may permit only linear back-and-forth motion for the third cam member 803. For example, the third cam member 803 may be installed to be able only to linearly move back and forth inside the second guide tube 451.

1. Guide Structure

The configuration of the guide structure 905 and/or the cam members 801, 802, and 803 is/are described below in greater detail with reference to FIGS. 9 to 17.

Figure 9:
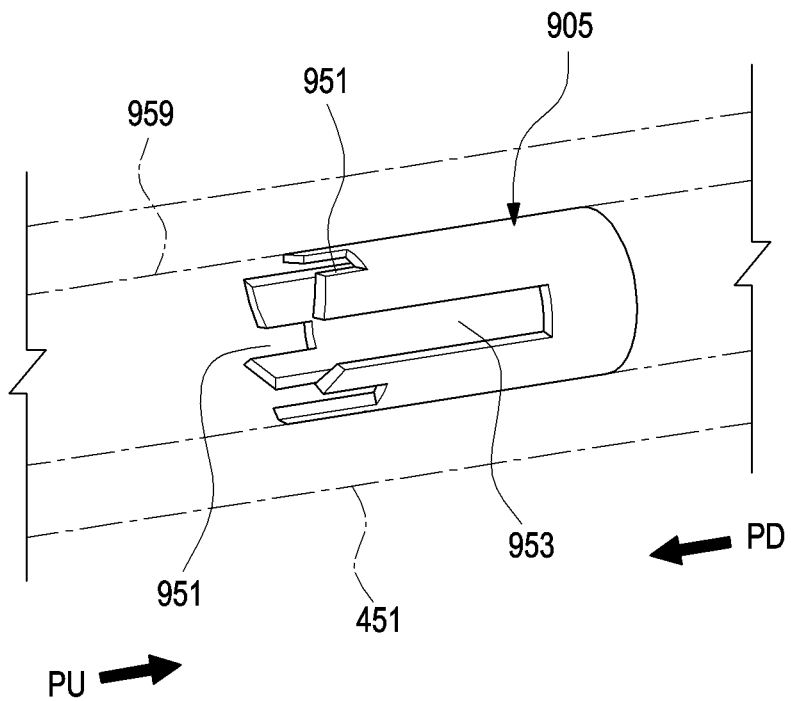
FIG. 9 is a view illustrating a guide structure of a push-eject mechanism of an input device according to an embodiment.

FIG. 9 is a perspective view illustrating a guide structure 905 of a push-eject mechanism 800 of an input device according to an embodiment. For illustrative purposes, FIG. 10 describes guide structure 905 in an "unrolled" state.

Figure 10:
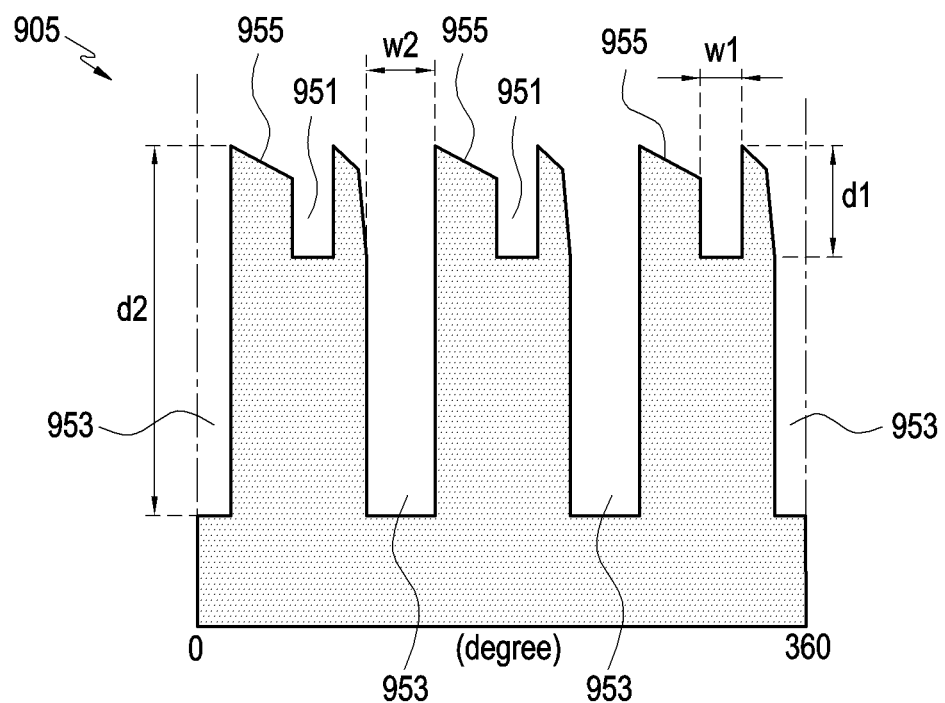
FIG. 10 is a planar figure illustrating the guide structure of FIG. 9.

Referring to FIGS. 9 and 10, a guide tube, e.g., the second guide tube 451, may include an operation hole 959 to receive the cam members 801, 802, and 803 and/or the shaft 455, and a guide structure 905 may be formed on the inner circumferential surface of the guide tube, e.g., the inner wall of the operation hole 959, to guide the cam members 801, 802, and 803 to linearly move back and forth or rotate. The guide structure 905 may substantially project from the inner wall of the operation hole 959 and may include guide recesses 951 and 953 which are openings in an inner side, e.g., in a side adjacent to the above-described first body portion 401. For example, the guide recesses 951 and 953 may have open ends on the side where the first cam member 801 is disposed and closed ends on the side where the third cam member 803 is disposed, and the open tops of the guide recesses 951 and 953 may be arranged to face the first body portion 401. The guide recesses 951 and 953 may extend substantially parallel to the direction of linear back-and-forth motion of the cam members 801, 802, and 803. As described below, the cam members 801, 802, and 803 each may have a guide protrusion(s) corresponding to the guide recesses 951 and 953, and the guide recesses 951 and 953 and the guide protrusion(s) may guide the linear back-and-forth motion of the cam members 801, 802, and 803.

According to an embodiment, the guide recesses 951 and 953 may be formed of a combination of a plurality of first guide recesses 951 and a plurality of second guide recesses 953. For example, three first guide recesses 951 and three second guide recesses 953 may be alternately arranged along the circumferential direction of the guide structure 905 or the second guide tube 451. According to an embodiment, the first guide recess 951 may be extended from the open end by a first distance d1 and may have a first width w1. According to an embodiment, the second guide recess 953 may be extended from the open end by a second distance d2 and may have a second width w2. According to an embodiment, the first distance d1 may be smaller than the second distance d2, and the first width w1 may be smaller than the second width w2.

According to an embodiment, the guide structure 905 may include an inclined surface 955 between two adjacent guide recesses 951 and 953, e.g., between the first guide recess 951 and the second guide recess 953 positioned adjacent each other. For example, the inclined surface 955 may extend from the open end of the second guide recess 953 to the open end of the first guide recess 951 and may be formed to be inclined with respect to the first guide recess 951 or the second guide recess 953. According to an embodiment, as viewed from the open end of the second guide recess 953, the inclined surface 955 may extend to the closed end of the first guide recess 951.

Figure 11A:
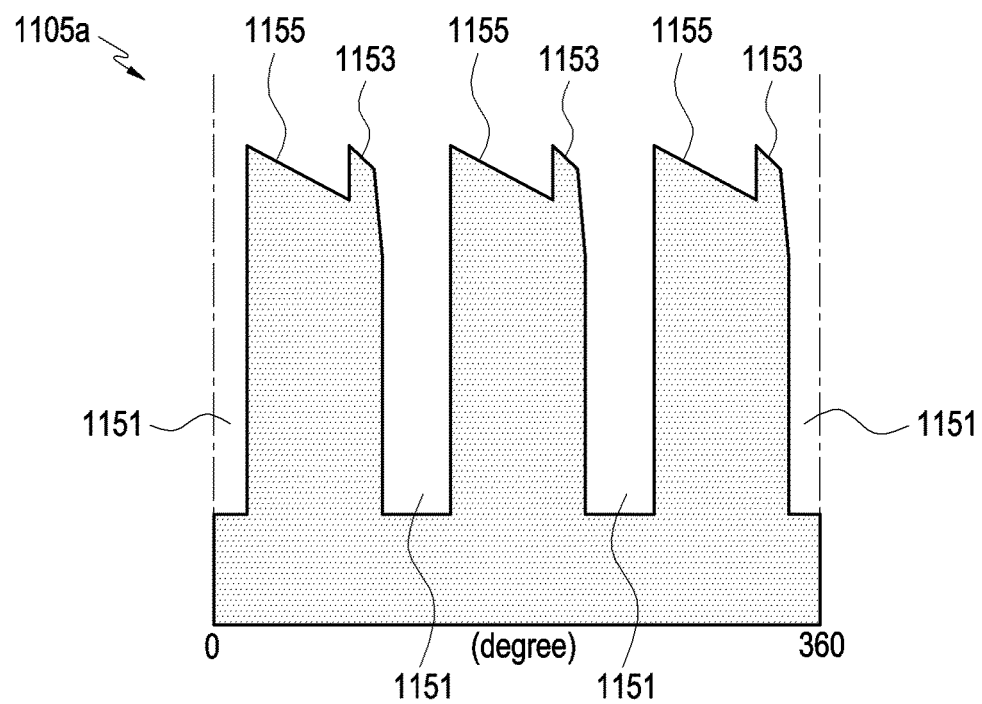
FIG. 11A and FIG. 11B are planar figures illustrating example modifications to the guide structure of FIG. 9.
Figure 11B:
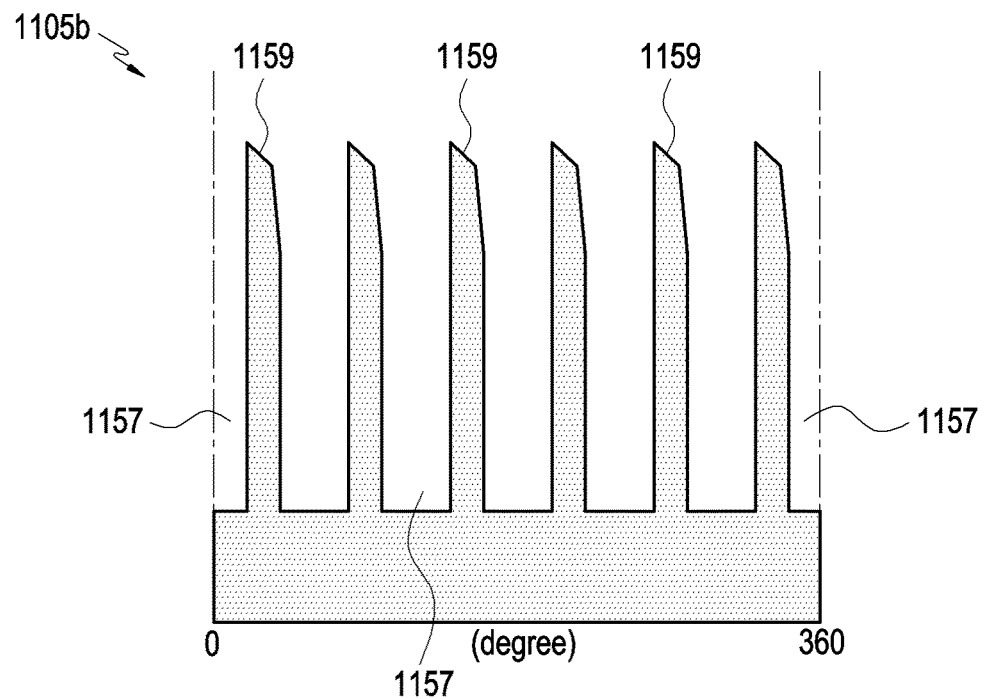

For illustrative purposes, FIG. 11A and FIG. 11B describe modifications to the guide structure of FIG. 9 in unrolled states.

Referring to FIG. 11A, a guide structure 1105a may include a plurality of, e.g., three, guide recesses 1151 and an inclined surface 1155 extending between two guide recesses 1151, and a stopping jaw 1153 may be formed on the inclined surface 1155. The guide recess 1151 may be formed to have a similar length and width to the second guide recess 953 of FIG. 10. The inclined surface 1155 may extend from the open end of one of the guide recesses 1151 to another guide recess and be formed to be inclined with respect to the guide recess 1151. For example, the inclined surface 1155 may extend from the open end of one of the guide recesses 1151 to the closed end of another adjacent guide recess 1151. The stopping jaw 1153 may extend from one of both ends of the inclined surface 1155, e.g., the end of the inclined surface 1155 which is closer to the closed end of the guide recess 1151, and a portion of the stopping jaw 1153 may be formed to wrap around a portion of the guide recess 1151.

As described below, the guide protrusion of the first cam member 801 or second cam member 802 may be positioned on the inclined surface 1155. With the guide protrusion of the second cam member 802 positioned on the inclined surface 1155, the elastic force of the first elastic member 851a may allow the guide protrusion of the second cam member 802 to be kept in tight contact with the inclined surface 1155 or the stopping jaw 1153. For example, the guide protrusion of the second cam member 802 may be interfered with or supported by the stopping jaw 1153, thus restricting the rotation of the second cam member. According to an embodiment, even with the guide protrusion of the first cam member 801 or the second cam member 802 fastened on the inclined surface 1155, the elastic force of the first elastic member 551a may not be partially exerted to the third cam member 803 or the shaft 455. According to an embodiment, with the guide protrusion of the first cam member 801 or second cam member 802 fastened on the inclined surface 1155, the third cam member 803 or the shaft 455 may only receive the elastic force of the second elastic member 851a.

Referring to FIG. 11B, the guide structure 1105b may include a plurality of, e.g., six, guide recesses 1157 and guide ribs 1159 each extending between two adjacent guide recesses 1157. For example, the guide ribs 1159 may extend from the inner wall of the guide tube (e.g., the guide tube 421 or 451 of FIG. 4) along the direction of linear back-and-forth motion of the button member (e.g., the button member 453 of FIG. 4) and be arranged at predetermined intervals along the circumferential direction, thereby forming the guide recesses 1157.

According to an embodiment, the guide protrusions of the cam members (e.g., the cam members 801, 802, and 803 of FIG. 8) may substantially freely be inserted or enter into the inside of the guide recess 1157. For example, when the user pushes and linearly moves the button member 453, the input device (e.g., the input device 400 of FIG. 4) may produce a first input signal at the time of the guide protrusion of the first cam member 801 among the cam members 801, 802, and 803 escaping from the guide recess 1157. According to an embodiment, when the user pushes the button member 453 at the time of the guide protrusion of the first cam member 801 escaping from the guide recess 1157, the input device 400 may produce a second input signal at the time when the guide protrusion of the second cam member 802 among the cam members 801, 802, and 803 escapes from the guide recess 1157.

As such, the input device 400 may produce different input signals depending on the distance by which the button member 453 linearly moves, and the electronic device (e.g., the electronic device 100 of FIG. 1 or 300 of FIG. 3) may perform various operations based on such input signals. According to an embodiment, in a capturing mode, the electronic device 100 or 300 may perform a half-shutter operation based on the first input signal and may obtain (e.g., capture) an image of the object based on the second input signal.

2. First Cam Member

Figure 12:
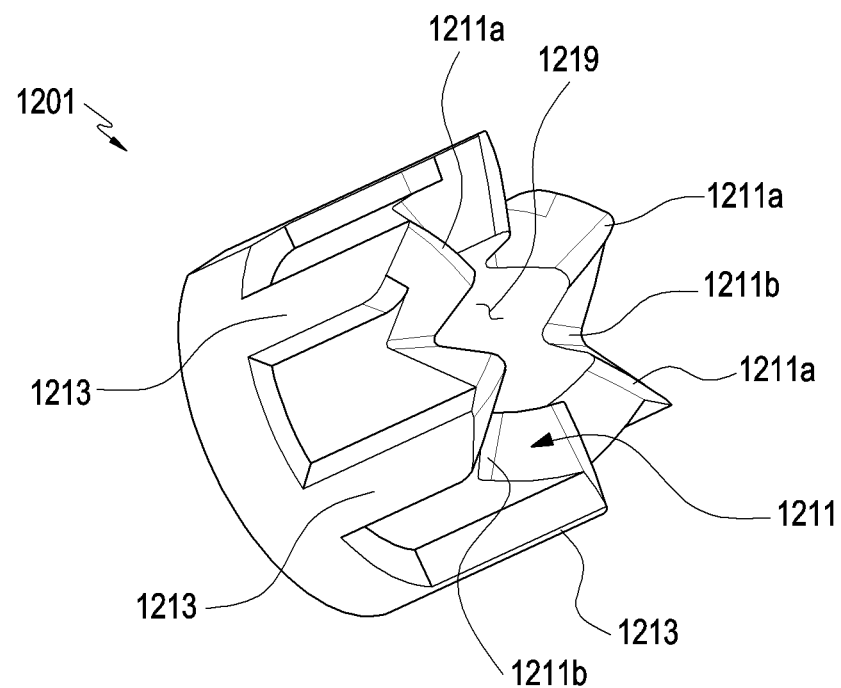
FIG. 12 is a perspective view illustrating a first cam member of a push-eject mechanism of an input device according to an embodiment.
Figure 13:
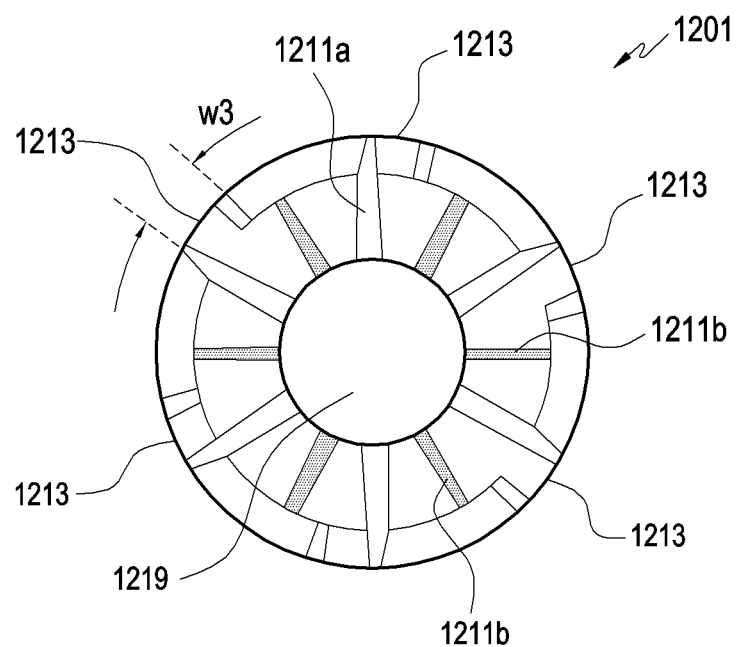
FIG. 13 is a plan view illustrating a first cam member of a push-eject mechanism of an input device according to an embodiment.

FIG. 12 is a perspective view illustrating a first cam member 1201 of a push-eject mechanism of an input device according to an embodiment. FIG. 13 is a plan view illustrating a first cam member 1201 of a push-eject mechanism of an input device according to an embodiment.

Referring to FIGS. 12 and 13, a first cam member 1201 (e.g., the first cam member 801 of FIG. 8) may include a first cam surface 1211 formed at one end thereof, a first guide protrusion 1213 formed on the outer circumferential surface, and a first through hole 1219 formed through from one end to the other. According to an embodiment, as the shaft 455 of FIG. 8 is coupled through the first through hole 1219, the first cam member 1201 may be rendered to be able to rotate or linearly move on the shaft 455. The first cam surface 1211 may include a plurality of ridge portions 1211a and valley portions 1211b which are formed as combinations of inclined surfaces or curved surfaces. The ridge portions 1211a and the valley portions 1211b may come in a diversity of shapes, sizes, or numbers depending on the design specifications of the input device 400 (e.g., the push-eject mechanism 800 of FIG. 8). The ridge portions 1211a and the valleys 1211b may alternately be arrayed from one end of the first cam member 1201 along the circumferential direction.

According to an embodiment, a plurality of first guide protrusions 1213 may be formed on the outer circumferential surface of the first cam member 1201. For example, the plurality of first guide protrusions 1213 may be equi-angularly arranged along the circumferential direction on the outer circumferential surface of the first cam member 1201 and be extended along the direction of linear back-and-forth motion of the first cam member 1201 or the shaft 455. According to an embodiment, the first guide protrusion 1213 may have a third width w3 which is measured along the circumferential direction. The third width w3 may mean a width which is substantially the same as the first width w1 of FIG. 10 and permits insertion of the first guide protrusion 1213 into the first guide recess 951. For example, the first guide protrusion 1213 may enter into the first guide recess 951 or the second guide recess 953, and the first cam member 1201 may substantially linearly move back and forth inside the second guide tube 451 while being guided by the first guide recess 951. According to an embodiment, since the second width w2 of FIG. 10 is larger than the first width w1, the first guide protrusion 1213 may be able to linearly move back and forth inside the second guide recess (e.g., the second guide recess 953 of FIG. 10) of the guide structure 905. In the following detailed description, the "first width w1" may be used to encompass in meaning the width of the first guide protrusion 1213 (e.g., the third width w3).

In the above embodiments, such an example is disclosed where the first guide protrusions 1213 substantially correspond in shape and number to the guide structure 905 of FIG. 10. According to an embodiment, when the guide structure is shaped as shown in FIG. 11A, only three first guide protrusions 1213 may be formed. According to an embodiment, the first guide protrusions 1213 may be substantially equi-angularly arranged and, when one of the first guide protrusions 1213 is positioned inside the first guide recess 951 of FIG. 10, the other first guide protrusion 1213 may be positioned inside a different first guide recess 951 or second guide recess 953. According to an embodiment, when the first cam member 1201 has a structure corresponding to the guide structure 1105a of FIG. 11A, and one first guide protrusion 1213 is positioned inside the guide recess 1151, the two remaining guide protrusions 1213 may be positioned inside other guide recesses 1151.

According to an embodiment, in the guide structure 1105a of FIG. 11A, with the guide protrusion (e.g., the first guide protrusion 1213 of FIG. 12) of the first cam member 1201 escaping from the guide recess 1151, the first cam member 1201 may receive an elastic force from the first elastic member (e.g., the first elastic member 551a of FIG. 8), allowing the first guide protrusion 1213 to tightly contact the inclined surface 1155. For example, when in the guide structure 1105a of FIG. 11A, the first guide protrusion 1213 escapes from the guide recess 1151 and is thus positioned on the inclined surface 1155, the distance or range in which the first cam member 1201 may move in the pop-up direction PU may be limited. Unless the first cam member 1201 is able to move in the pop-up direction PU, the elastic force of the first elastic member 551a may substantially be prevented from being transferred to the second cam member (e.g., the second cam member 802 of FIG. 8) or the third cam member (e.g., the third cam member 803 of FIG. 8). For example, the second cam member 802 or the third cam member 803 may have the propensity to receive an elastic force from the second elastic member (e.g., the second elastic member 851a of FIG. 8) and move in the pop-down direction (PD). According to an embodiment, while receiving an elastic force from the second elastic member 851a with no elastic force (e.g., restoration force) being exerted from the first elastic member 551a, the second cam member 802 may remain stationary in the position of contacting the first cam member 801.

In the instant embodiment, although the first guide protrusion 1213 is shown to be shaped as extending along the direction of linear back-and-forth motion of the first cam member or the shaft, it should be noted that embodiments of the disclosure are not limited thereto. For example, the first guide protrusion 1213 may be a structure which is combined with the first guide recess 951 to guide the linear back-and-forth motion of the first cam member 1201, and the shape of the first guide protrusion 1213 is not necessarily limited to that shown and described herein.

3. Second Cam Member

Figure 14:
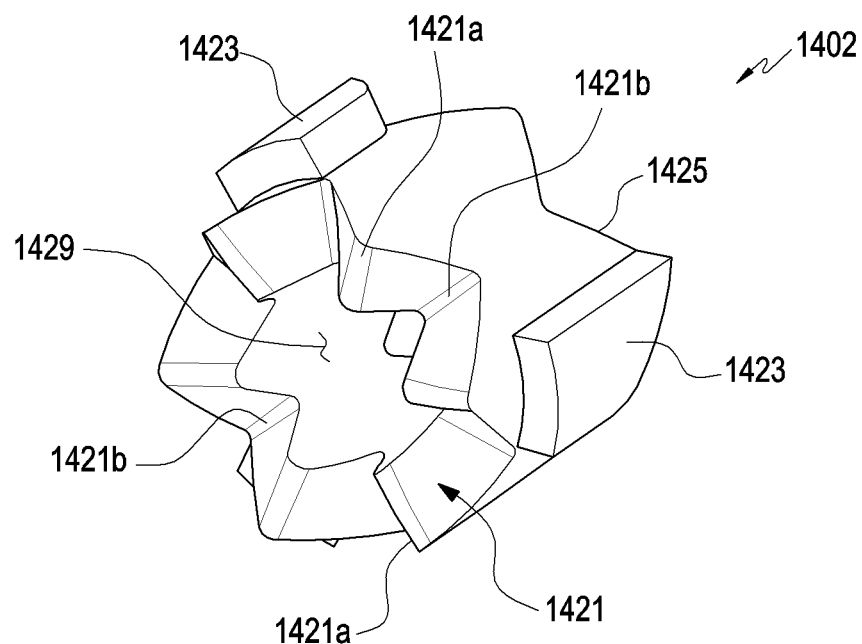
FIG. 14 is a perspective view illustrating a second cam member of a push-eject mechanism of an input device according to an embodiment.
Figure 15:
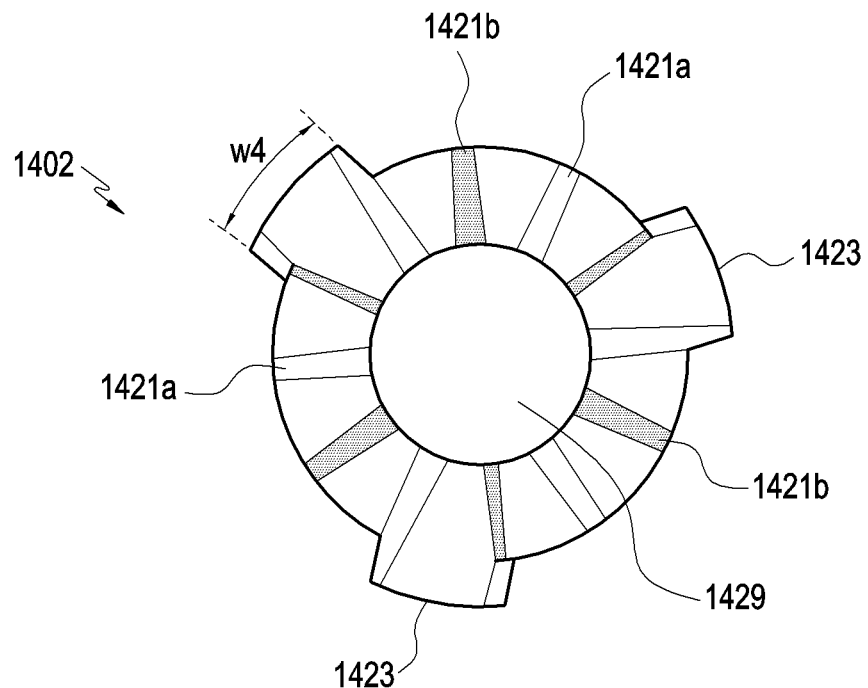
FIG. 15 is a plan view illustrating a second cam member of a push-eject mechanism of an input device according to an embodiment.

FIG. 14 is a perspective view illustrating a second cam member 1402 of a push-eject mechanism of an input device according to an embodiment. FIG. 15 is a plan view illustrating a second cam member 1402 of a push-eject mechanism of an input device according to an embodiment.

Referring to FIGS. 14 and 15, a second cam member 1402 (e.g., the second cam member 802 of FIG. 8) may include second cam surfaces 1421 and 1425 formed at both ends thereof, a second guide protrusion 1423 formed on the outer circumferential surface, and a second through hole 1429 formed through from one end to the other. The configuration of the second cam surfaces 1421 and 1425 or the second through hole 1429 is similar to the configuration of the first cam surface 1211 or first through hole 1219 of the first cam member 1201 and no detailed description thereof is given below. However, the second cam surfaces 1421 and 1425 may be formed at both ends, respectively, of the second cam member 1402 and, as viewed in the direction of linear back-and-forth motion of the shaft (e.g., the shaft 455 of FIG. 8) or the second cam member 1402, the ridge portion 1421a (or valley portion 1421b) of the second cam surface which is denoted "1421" may be offset from the ridge portion 1421a (or valley portion 1421b) of the second cam surface which is denoted "1425." According to an embodiment, the second cam member 1402 may be disposed with the second cam surface 1421 facing the first cam surface 1211 (e.g., the first cam surface 1211 of FIG. 12).

According to an embodiment, a plurality of, e.g., three, second guide protrusions 1423 may be formed on the outer circumferential surface of the second cam member 1402. For example, the plurality of second guide protrusions 1423 may be equi-angularly arranged along the circumferential direction on the outer circumferential surface of the second cam member 1402 and be extended along the direction of linear back-and-forth motion of the second cam member 1402 or the shaft 455. According to an embodiment, the second guide protrusion 1423 may have a fourth width w4 which is measured along the circumferential direction. The fourth width w4 may mean a width which is substantially the same as the second width w2 of FIG. 10 and permits insertion of the second guide protrusion 1423 into the second guide recess 953. For example, the second guide protrusion 1423 may be linearly moved back and forth while being guided by the second guide recess 953, and the second cam member 1402 may substantially be guided by the second guide recess 953 while linearly moving back and forth inside the second guide tube 451. According to an embodiment, since the second width w2 is larger than the first width w1, the second guide protrusion 1423 may be limited from entering into the first guide recess 951 of FIG. 10. For example, the second cam member 1402 shaped to correspond to the guide structure 905 of FIG. 10 may have three second guide protrusions 1423 corresponding to the second guide recesses 953 of FIG. 10 and, although the second guide protrusions 1423 are aligned with the first guide recesses 951, they may be restricted from entry into the first guide recesses 951. According to an embodiment, given where the first cam member 1201 and the second cam member 1402 are arranged, the first guide protrusions 1213 may be able to enter into the second guide recesses 953 only when the second guide protrusions 1423 are positioned inside the second guide recesses 953. In the following detailed description, the "second width w2" may be used to encompass in meaning the width of the second guide protrusion 1423 (e.g., the fourth width w4).

In the instant embodiment, although the second guide protrusion 1423 is shown to be shaped as extending along the direction of linear back-and-forth motion of the second cam member or the shaft, it should be noted that embodiments of the disclosure are not limited thereto. For example, the second guide protrusion 1423 may be a structure which is combined with the second guide recess 953 to guide the linear back-and-forth motion of the second cam member 1402, and the shape of the second guide protrusion 1423 is not necessarily limited to that shown and described herein.

Figure 16:
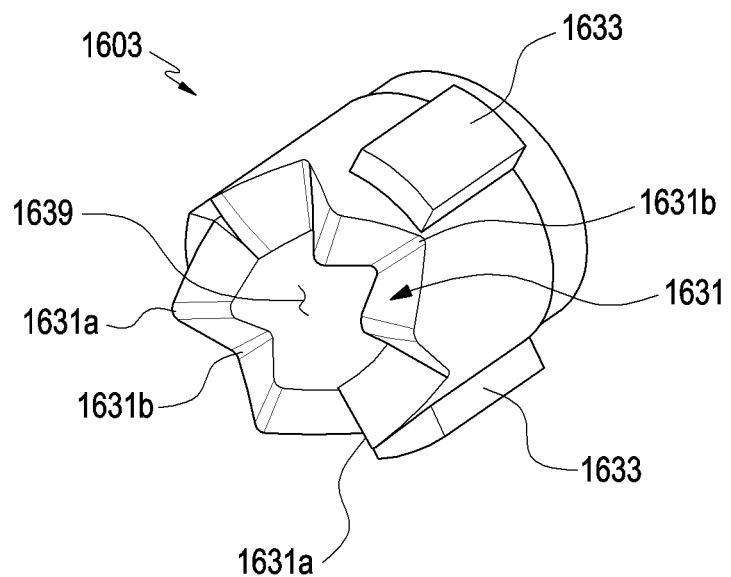
FIG. 16 is a perspective view illustrating a third cam member of a push-eject mechanism of an input device according to an embodiment.
Figure 17:
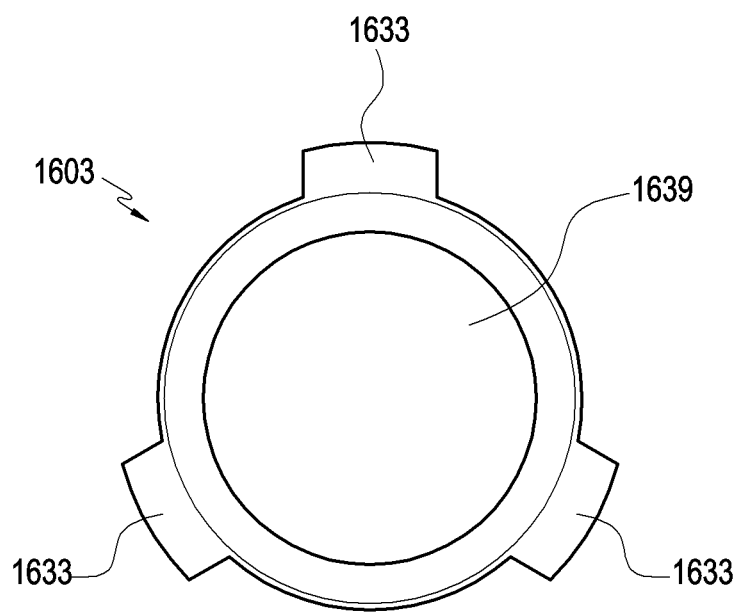
FIG. 17 is a plan view illustrating a third cam member of a push-eject mechanism of an input device according to an embodiment.

FIG. 16 is a perspective view illustrating a third cam member 1603 of a push-eject mechanism of an input device according to an embodiment. FIG. 17 is a plan view illustrating a third cam member 1603 of a push-eject mechanism of an input device according to an embodiment.

4. Third Cam Member

Referring to FIGS. 16 and 17, a third cam member 1603 (e.g., the third cam member 803 of FIG. 8) may include a third cam surface 1631 formed at one end thereof, a third guide protrusion 1633 formed on the outer circumferential surface, and a third through hole 1639 formed through from one end to the other. The third cam surface 1631 may include ridge portions 1631a and valley portions 1631b. The configuration of the third cam surface 1631 is similar to the configuration of the first cam surface 1211 of the first cam member 1201 and no detailed description thereof is given below. According to an embodiment, the third cam member 1603 may be disposed, with the third cam surface 1631 facing the second cam surface 1425. According to an embodiment, the shaft 455 may be disposed through the third through hole 1639 and, although no structure is separately shown, the third cam member 1603 may be linearly moved back and forth substantially along with the shaft 455. For example, the third cam member 1603 may be constrained by the shaft 455 in the direction of extension of the shaft 455.

According to an embodiment, a plurality of, e.g., three, third guide protrusions 1633 may be formed on the outer circumferential surface of the third cam member 1603. For example, the plurality of third guide protrusions 1633 may be equi-angularly arranged along the circumferential direction on the outer circumferential surface of the third cam member 1603 and be extended along the direction of linear back-and-forth motion of the third cam member 1603 or the shaft 455. The third guide protrusion 1633 may substantially be positioned inside the second guide recess 953 of FIG. 10 or the guide recess 1151 of FIG. 11A to guide the linear back-and-forth motion of the third cam member 1603. The width of the third guide protrusion 1633 may be the same as the width of the second guide protrusion 1423 and, in the following embodiments, the "second width w2" may be used to encompass in meaning the width of the third guide protrusion 1633.

In the following embodiments, the operation of the above-described push-eject mechanism is described. FIG. 8 may further be referred to for the detailed description of the operation of the push-eject mechanism, and the positional relationship between the cam members depending on operation states may be slightly inconsistent with the aligned state shown in FIG. 8. For example, the positional relationship between the cam members 801, 802, and 803 shown in FIG. 8 may correspond to the operation state of FIGS. 24 to 27 described below and the embodiment of, e.g., FIG. 18 may slightly be different from the aligned state of the cam members 801, 802, and 803 shown in FIG. 8.

Figure 18:
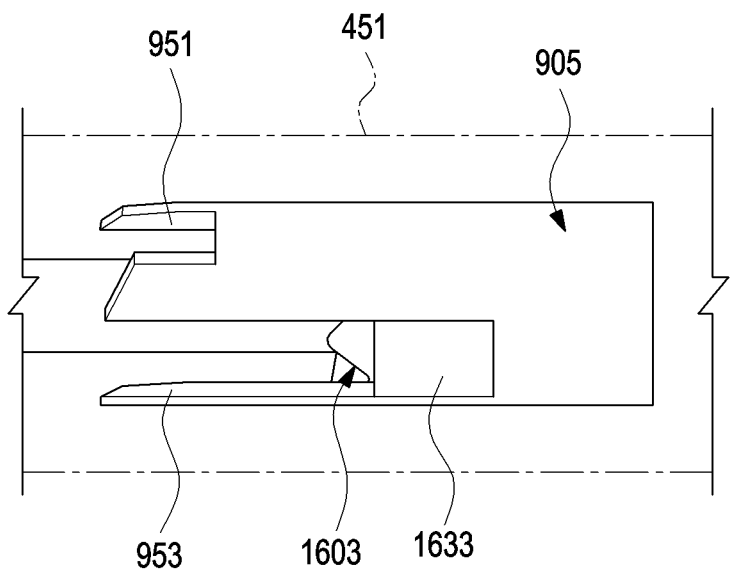
FIG. 18 is a view illustrating an operation of a third cam member of a push-eject mechanism of an input device according to an embodiment.
Figure 19:
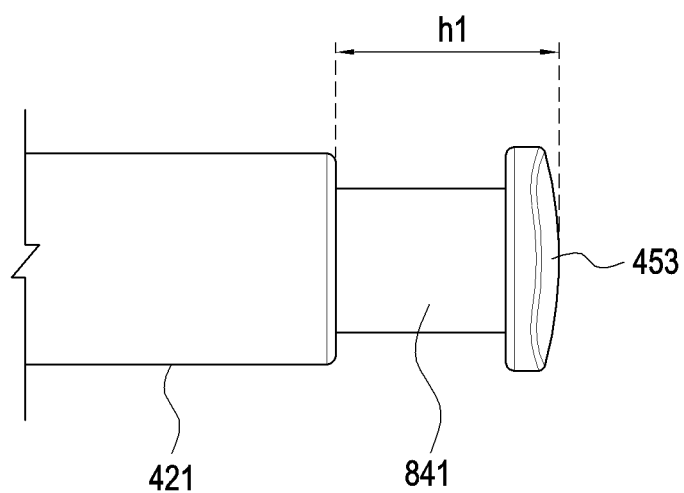
FIG. 19 is a view illustrating a position of a button member in the state shown in FIG. 18.

FIG. 18 is a view illustrating an operation of a third cam member 1603 of a push-eject mechanism of an input device according to an embodiment. FIG. 19 is a view illustrating a position of a button member 453 in the state shown in FIG. 18.

FIGS. 18 and 19 illustrate an example pop-up state in which the button member 453 projects from an end of the first guide tube 421 as long as possible but within a range that the push-eject mechanism 800 permits. Referring to FIGS. 18 and 19 along with FIG. 8, the third guide protrusion 1633 may be positioned to tightly contact the closed end of the second guide recess 953. Although not shown, in the pop-up state, the second guide protrusion (e.g., the second guide protrusion 1423 of FIG. 14) of the second cam member (e.g., the second cam member 1402 of FIG. 14) may be received in the second guide recess 953, and the first guide protrusion (e.g., the first guide protrusion 1213 of FIG. 12) of the first cam member (e.g., the first cam member 1201 of FIG. 12) may be received either in the first guide recess 951 or in the second guide recess 953. In the pop-up state, the button member 453 or the connecting member 841 may at least partially be exposed to the outside of the first guide tube 421, and the button member 453 may be projected as high as height h1 from an end of the first guide tube 421. In the pop-up state, the third cam member 1603 or the shaft 455 may substantially receive an elastic force from the first elastic member 551a and the second elastic member 851a and, since the elastic force of the first elastic member 551a is larger, the button member 453 may remain in the pop-up state.

The relative positional relationships between the cam members (e.g., the cam members 801, 802, and 803 of FIG. 8) in the pop-up state are described below further referring to FIGS. 20 and 21.

Figure 20:
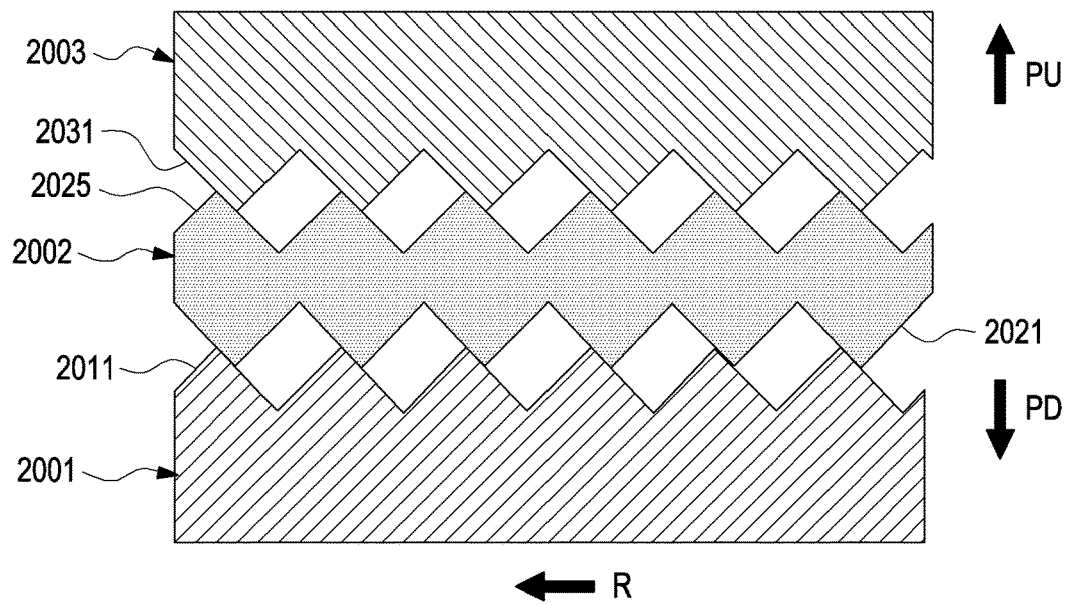
FIG. 20 and FIG. 21 are configuration views illustrating the operational relationship between cam members and a guide structure in the state shown in FIG. 18.
Figure 21:
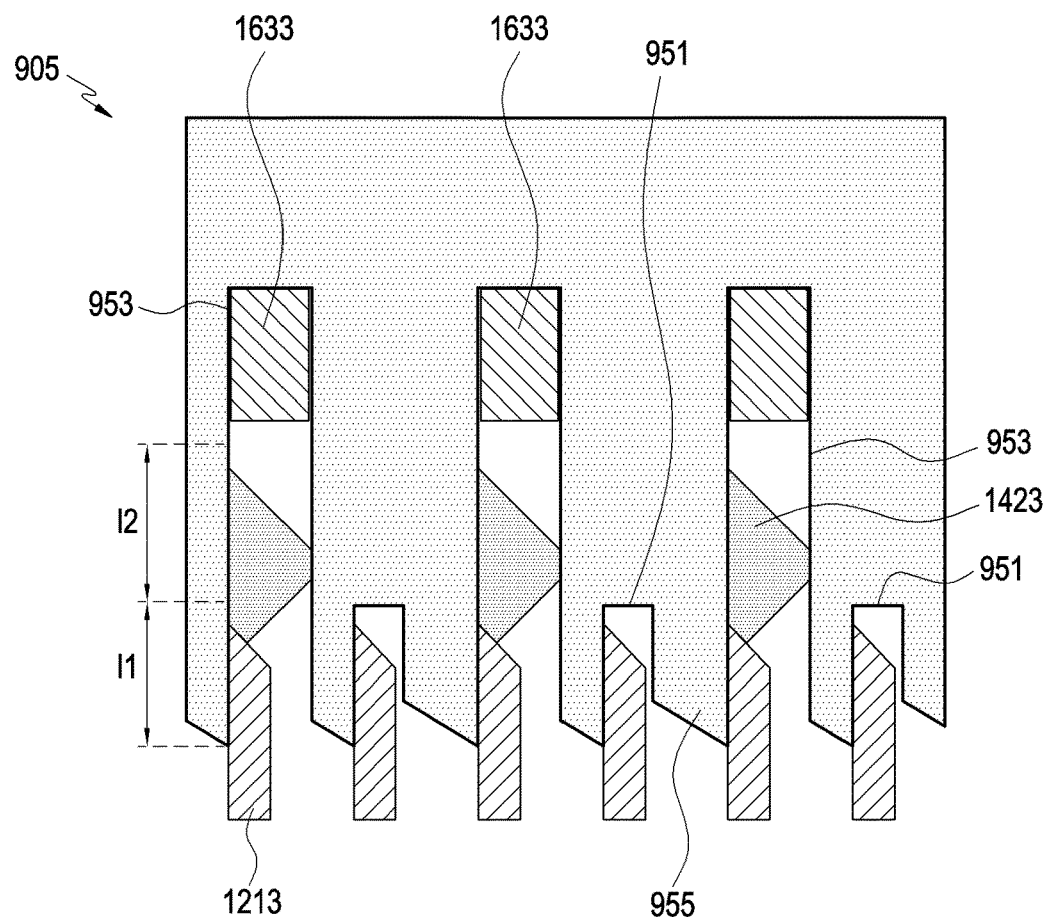

FIGS. 20 and 21 are configuration views illustrating the operational relationship between first, second, and third cam members 2001, 2002, and 2003 and a guide structure 905 in the state shown in FIG. 18, the pop-up state.

FIGS. 20 and 21 are exploded views respectively illustrating the positional relationship between the first, second, and third cam members 2001, 2002, and 2003 (e.g., the cam members 801, 802, and 803 of FIG. 8) and the positional relationship between the guide protrusions 1213, 1423, and 1633 on the guide structure 905. Referring to FIG. 20, in the pop-up state, the cam members 2001, 2002, and 2003 may be arranged, with the ridge portions of one cam member 2001, 2002, and 2003 failing to completely engage with the valley portions of another. The first elastic member (e.g., the first elastic member 551a) may provide an elastic force of being exerted in the pop-up direction PU to the first cam member 2001, and the second elastic member (e.g., the second elastic member 851a of FIG. 8) may provide an elastic force of being exerted in the pop-down direction (PD) to the third cam member 2003. For example, elastic force may be provided which may be exerted to bright the cam members 2001, 2002, and 2003 in tight contact with each other.

According to an embodiment, in the state of being arrayed as shown in FIG. 20 with respect to the third cam member 2003 (e.g., the third cam member 1603 of FIG. 18), the second cam member 2002 and the third cam member 2003 may have the propensity to be rotated in one direction (hereinafter, an R direction) by the elastic force of the elastic members 551a and 851a and the arrangement relationship between the cam surfaces 2011, 2021, 2025, and 2031.

However, since the guide protrusions 1213, 1423, and 1633 are engaged with the first guide recesses 951 or the second guide recess 953 as shown in FIG. 21, the rotation of the cam members 2001, 2002, and 2003 may be limited. For example, in the pop-up state, the cam members 2001, 2002, and 2003 may transfer the elastic force of the elastic members 551a and 851a to the shaft 455 while being guided or restricted by the guide structure 905. When the first elastic member 551a provides a larger elastic force than the second elastic member 851a does, the button member 453 may remain projected substantially as high as the first height h1 (refer to FIG. 19). According to an embodiment, the second guide recess 953 may be formed in a length including, at least, the first interval and the second interval, and the first guide recess 951 may include the first interval and extend in a shorter distance than the second guide recesses.

According to an embodiment, the first cam member 2001 may linearly move back and forth in the first interval I1, and the second connecting member 2002 may linearly move back and forth in the second interval I1. The second interval I2 may mean an interval which substantially connects with the first interval I1 and differs from the first interval I1. For example, the second interval I2 may mean an interval between where the second cam member 2002 and the third cam member 2003 contact each other, with the third guide protrusion 1633 contacting the closed end of the second guide recess 953 and where the first guide protrusion 1213 escapes from the first guide recess 951 or the second guide recess 953 to turn into a rotatable state. According to an embodiment, the first interval I1 and the second interval I2 may mean ranges in which the respective portions of the first cam member 2001 and the second cam member 2002 linearly move back and forth. According to an embodiment, in the state shown in FIG. 20 or 21, the surface of the first cam member 2001 which contacts the second cam member 2002 is referred to as a first surface, the position of the first surface may be one end of the first interval I1. For example, the first interval I1 may be defined as an interval during which the first cam member 2001 moves from the position of the first surface until the first guide protrusion 1213 escapes from the second guide recess 953 (or the first guide recess 951) in the state shown in FIG. 20 or 21. When the surface of the second cam member 2002 which contacts the first surface in the state shown in FIG. 20 or 21 is referred to as a second surface, the position of the second surface may be one end of the second interval I2, and the second interval I2 may be defined as an interval during which the second cam member 2002 moves from the position of the second surface until the first guide protrusion 1213 escapes from the second guide recess 953 (or the first guide recess 951).

According to an embodiment, the first cam member 2001 may linearly move back and forth while receiving an elastic force from the first elastic member 551a, and the position where the first guide protrusion 1213 escapes from the first guide recess 951 or the second guide recess 953 (hereinafter, a 'first position') may be one of both ends of the first interval I1. According to an embodiment, the first position may mean a position where the first guide protrusion 1213 fully escapes from the first guide protrusion 1213 and be formed between the position shown in FIG. 22 and the position shown in FIG. 23. According to an embodiment, as an external force (e.g., by the user's manipulation) is exerted in the pop-down direction so that the first guide protrusion 1213 reaches the first position, the first cam member 2001 may be freely rotated. For example, the first guide protrusion 1213 reaches the first position and escapes from the first guide recess 951 or the second guide recess 953, and the first cam member 2001 may be rotated in R direction by being guided along the first cam surface 2011 and the second cam surface 2021 and the elastic force of the elastic members 551a and 851a.

The rotational operation of the first cam member 2001 is described below further referring to, e.g., FIG. 22.

Figure 22:
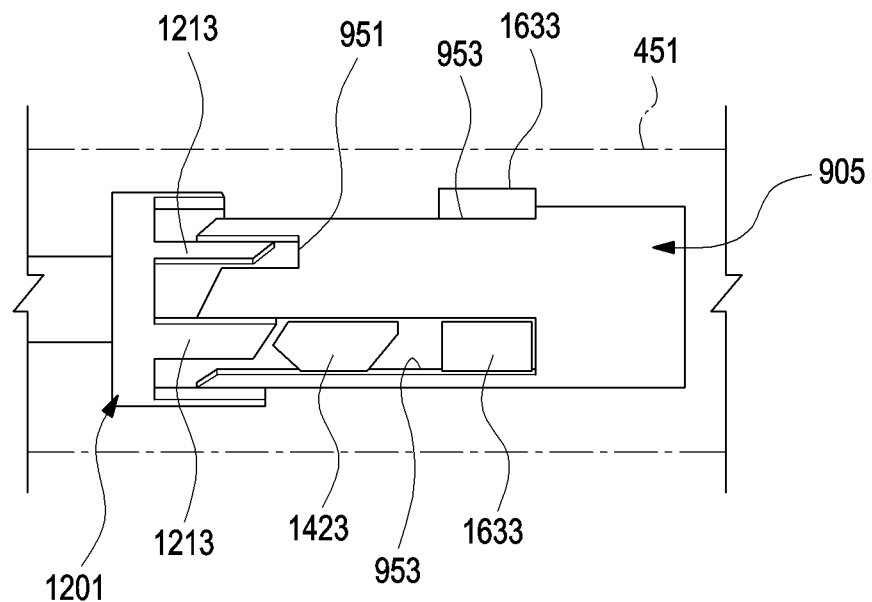
FIG. 22 is a view illustrating the positional relationship between cam members in the state shown in FIG. 18.
Figure 23:
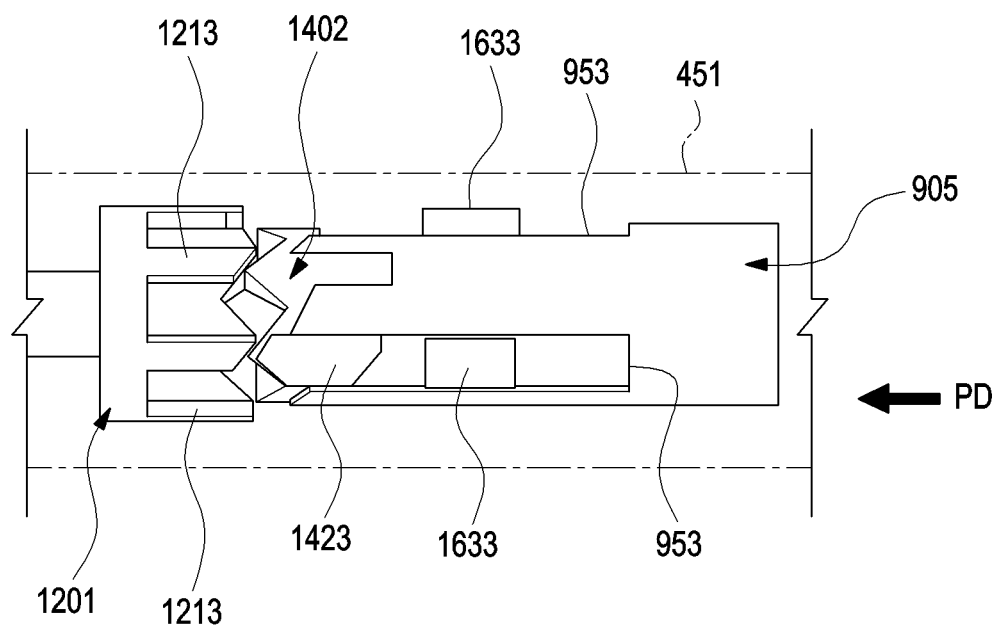
FIG. 23 and FIG. 24 are views illustrating a state in which a button member of an input device is pressed in some interval according to an embodiment.
Figure 24:
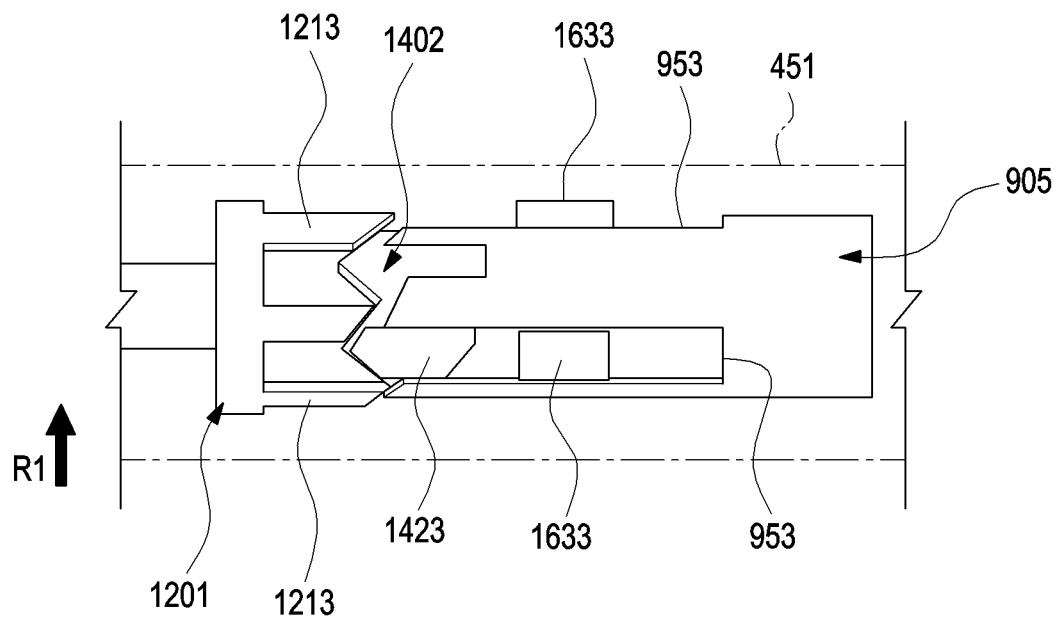
Figure 25:
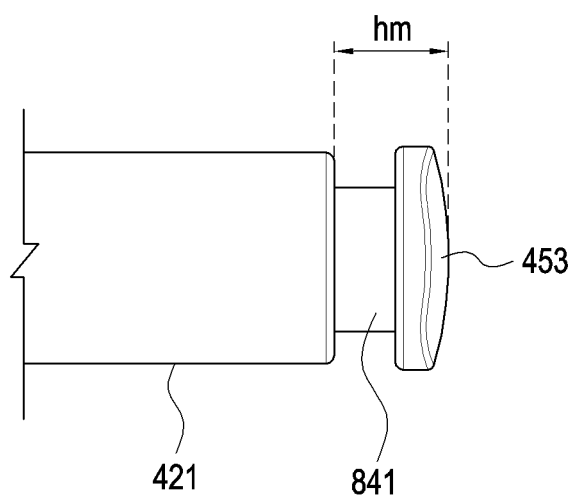
FIG. 25 is a view illustrating a position of a button member in the state shown in FIG. 24.

FIG. 22 is a view illustrating the positional relationship between cam members 1201, 1402, and 1603 in the state shown in FIG. 18. FIGS. 23 and 24 are views illustrating a state in which a button member 453 of an input device is pressed in some interval according to an embodiment. FIG. 25 is a view illustrating a position of a button member 453 in the state shown in FIG. 24.

Referring to FIGS. 22 and 23, when the button member 453 is pressed down by external force, the third cam member 1603 may be linearly moved towards the open end of the second guide recess 953, e.g., in the pop-down direction (PD). As the third cam member 1603 gradually moves in the pop-down direction (PD), the first cam member 1201 and the second cam member 1402 may also gradually move in the pop-down direction (PD) as set forth above. The first cam member 1201 may gradually move to the outside of the second guide recess 953, e.g., the first interval (e.g., the first interval I1 of FIG. 21) along the pop-down direction (PD). FIG. 23 illustrates a state in which the first guide protrusion 1213 fully escapes from the first interval I1 or the second guide recess 953. To further clarify the positional relationship between the cam surfaces of the first cam member 1201 and the second cam member 1402, FIG. 23 illustrates an example in which an end of the first guide protrusion 1213 is further offset by a predetermined distance from the open end of the second guide recess 953. However, in the actual operation of the push-eject mechanism (e.g., the push-eject mechanism 800 of FIG. 8), as being guided along the above-described cam surfaces and elastic force at the moment that the end of the first guide protrusion 1213 escapes from the open end of the second guide recess 953, the first cam member 1201 may be rotated in one direction (e.g., R direction of FIG. 20 or R1 direction of FIG. 24 which is described below).

FIG. 24 illustrates an example in which after the first guide protrusion 1213 escapes from the second guide recess 953, the first cam member 1201 is rotated. For example, the first cam member 1201 may be rotated in R1 direction while linearly moving back and forth in the pop-up direction PU by being guided along the respective cam surfaces of the first cam member 1201 and the second cam member 1402 as well as by the elastic force of the elastic members 551a and 851a at the moment that the end of the first guide protrusion 1213 escapes from the open end of the second guide recess 953. For example, as the ridge portions 1211a of the first cam member 1201 rotate in the direction of being engaged with the valley portions 1421b of the second cam member 1402, the first cam member 1201 may be brought in further tight contact with the second cam member 1402. At the moment that the ridge portion 1211a of the first cam member 1201 is engaged with the valley portion 1421b of the second cam member 1402, the cam surface (e.g., the first cam surface 1211 of FIG. 12) of the first cam member 1201 may collide with the cam surface (e.g., the first cam surface 1421 of FIG. 14) of the second cam surface 1421, producing a first click feeling.

FIG. 25 illustrates the position of the button member 453 at the time when the first click feeling occurs. When the first cam member 1201 rotates or the first click feeling occurs, the button member 453 may be in the state of being projected from an end of the first guide tube 421 as high as a medium height (hm). Here, "medium height" may mean a height which is larger than the height in the state where the button member 453 is fully or maximally inserted or enters into the first guide tube 421 but smaller than the first height (e.g., the first height h1 of FIG. 19) mentioned above.

According to an embodiment, at the moment of occurrence of the first click feeling, the input device (e.g., the input device 400 of FIG. 4) or the sensor module (e.g., the sensor module 501 of FIG. 5) may produce a first input signal. Further referring to FIG. 5, as the third cam member 1603 or the shaft 455 moves in the pop-down direction (PD), the magnet 555a of the sensor module 501 may gradually approach the hall sensor 543 of the sensor module 501, and the hall sensor 543 may detect a variation in magnetic field due to the movement of the magnet 555a. The signal generating circuit unit 703 of FIG. 7 may produce a first input signal based on the variation in magnetic field detected by the hall sensor 543. The input device 400, e.g., the input device 700 of FIG. 7, may transmit the produced first input signal to the electronic device (e.g., the electronic device 300 of FIG. 3). The electronic device 300 may receive the first input signal and perform various functions. For example, the electronic device 300 may receive the first input signal to thereby perform such a function as playing or pausing the playback of a sound or video file in the multimedia mode or execute a half-focusing or capturing command in the capturing mode. When there is a voice or video call request, the electronic device 300 may connect the requested call upon receiving the first input signal.

In the state shown in FIG. 24, when the external force (e.g., by the user's manipulation or push on the button member 453) exerted in the pop-down direction (PD) is released, the first cam member 1201 may be moved in the pop-up direction PU by the elastic force of the first elastic member 551a. While moving in the pop-up direction PU, the first guide protrusion 1213 may be interfered with by the inclined surface (e.g., the inclined surface 955 of FIG. 9) so that the first cam member 1201 may be further rotated in R1 direction and moved in the pop-up direction PU and may reenter into either the first guide recess 951 or the second guide recess 953. While moving in the pop-up direction PU in the state shown in FIG. 24, the second guide protrusion 1423 or the third guide protrusion 1633 is substantially positioned inside the second guide recess 953 and thus the second cam member 1402 and the third cam member 1603 may be linearly moved in the pop-up direction PU. For example, when no external force is exerted, the button member 453 may lose the state of being projected at the medium height hm and be projected back to the first height (e.g., the first height h1 of FIG. 19).

Figure 26:
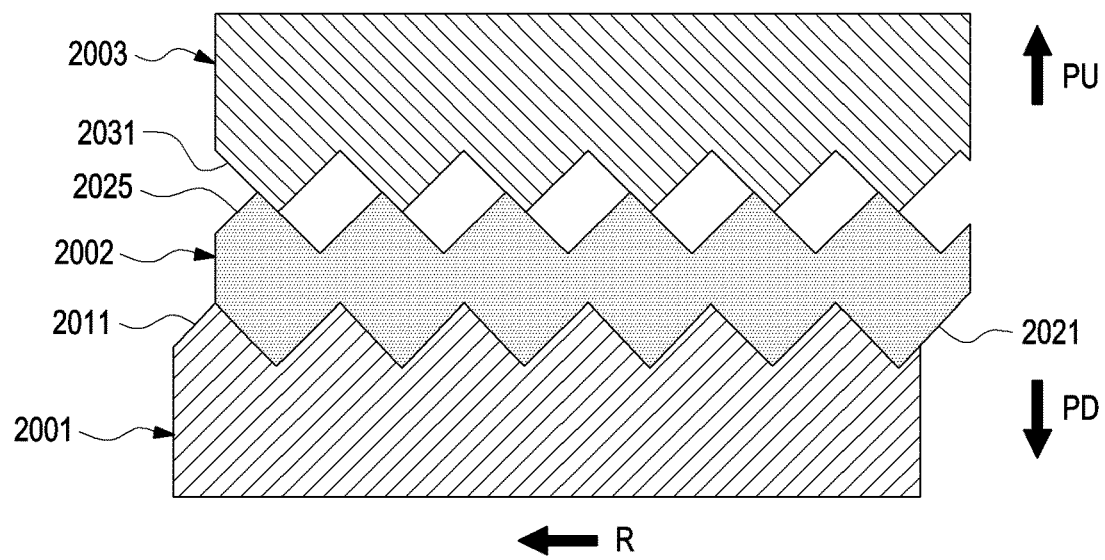
FIG. 26 and FIG. 27 are configuration views illustrating the operational relationship between cam members and a guide structure in the state shown in FIG. 24.
Figure 27:
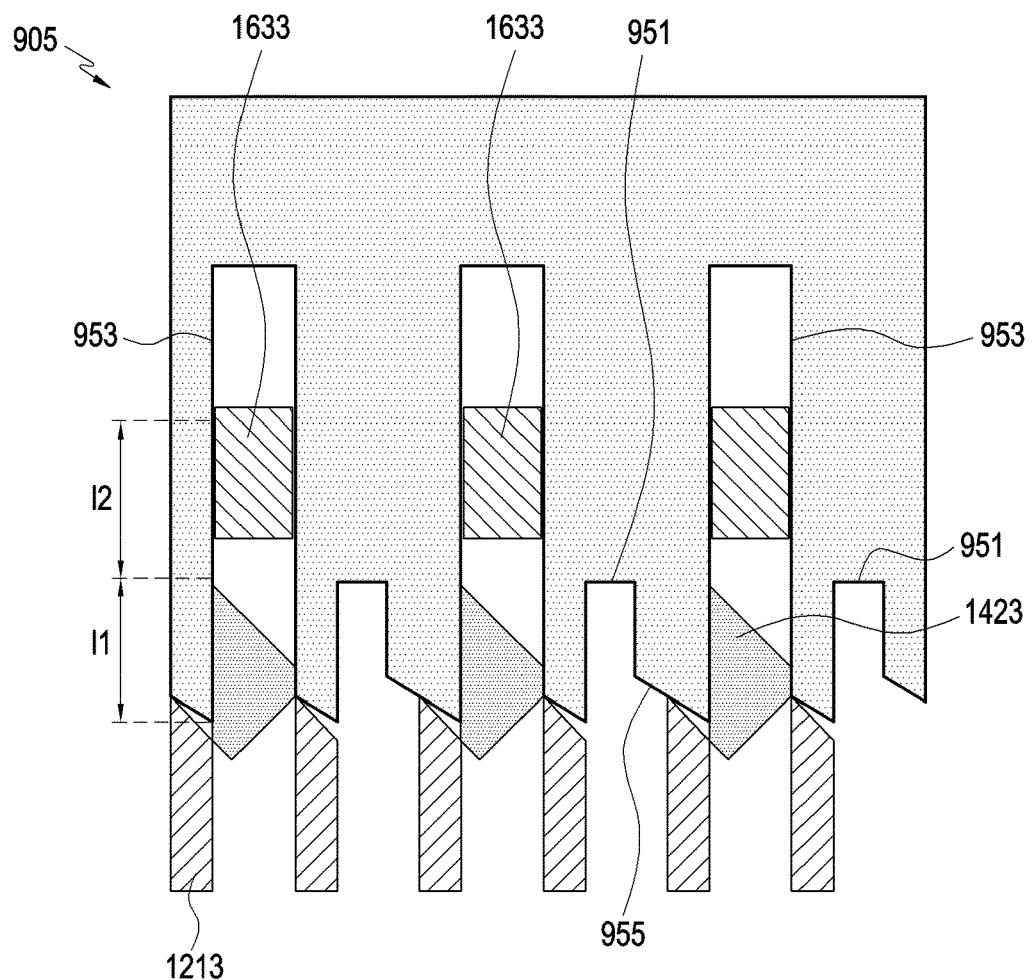

FIGS. 26 and 27 are configuration views illustrating the operational relationship between cam members 2001, 2002, and 2003 and a guide structure 905 in the state shown in FIG. 24.

Referring to FIGS. 26 and 27, the first guide protrusion 1213 may escape from the second guide recess 953, with the button member 453 projecting at the medium height (e.g., the medium height hm of FIG. 25), so that the first cam member 2001 may be rotated in R direction. Since the second guide protrusion 1423 and the third guide protrusion 1633 are still positioned inside the second guide recess 953 while the button member 453 is projected as high as the medium height hm, the second cam member 2002 and the third cam member 2003 may be capable of only linear motion. By the elastic force of the first elastic member 551a and being guided along the cam surfaces, the first cam member 2001 may be rotated in R direction while linearly moving in the pop-up direction PU. For example, the first cam member 2001 may be rotated in the direction along which the ridge portions 1211a of FIG. 12 are engaged with the valley portions 1421b of FIG. 14.

According to an embodiment, as the first cam member 2001 moves linearly while simultaneously rotating, the cam surfaces 2011 and 2021 may substantially collide with each other and thus be brought in tight contact with each other, and impacts or noise produced by the collision between the cam surfaces 2011 and 2021 may be delivered to the user in a tactile or auditory manner. The position where the first guide protrusion 1213 escapes from the second guide recess 953 or the position where the cam surfaces 2011 and 2021 collide with each other may be detected by the sensor module 501 of FIG. 5 and a first input signal may thus be produced, which has been described above. For example, the input device (e.g., the input device 400 of FIG. 4) or the push-eject mechanism (e.g., the push-eject mechanism 800 of FIG. 8) may detect the linear movement of the shaft 455 through the magnet and hall sensor (e.g., the magnet 555a and hall sensor 543 of FIG. 5) to thereby produce a first input signal, and the user may perceive a tactile or audible first click feeling substantially simultaneously with the time when the first input signal is produced.

When the external force applied to the button member (e.g., the button member 453 of FIG. 25) is removed in the state shown in FIG. 26 or 27, the first cam member 2001 may be moved in the pop-up direction PU by the elastic force of the first elastic member 551a. While moving in the pop-up direction PU, the first guide protrusion 1213 may be interfered with by the inclined surface 955 so that the first cam member 2001 may be further rotated in R1 direction and reenter into either the first guide recess 951 or the second guide recess 953. As the first cam member 2001 is moved in the pop-up direction PU by the elastic force of the first elastic member 551a, the second cam member 2002 and/or the third cam member 2003 may be moved in the pop-up direction PU. For example, when the external force applied to the button member 453 is removed in the state shown in FIG. 26 or 27, the button member 453 may be restored to the pop-up state shown in FIG. 19.

According to an embodiment, when the guide structure has the structure shown in FIG. 11A, the first guide protrusion 1213 of the first cam member 2001 may substantially be supported by the stopping jaw 1153 or inclined surface 1155 of the guide structure 1105a, thus failing to enter into the guide recess 1151. For example, the button member 453 may remain projected as high as the medium height (e.g., the medium height hm of FIG. 25) by the second elastic member 851a. An external force may be exerted for the first guide protrusion 1213 to enter back into the guide recess 1151 of FIG. 11a in the state supported by the inclined surface 1155 or stopping jaw 1153. For example, the first guide protrusion 1213 may move in the pop-down direction (PD) up to the position where it escapes from (or beyond) the stopping jaw 1153. When the first guide protrusion 1213 escapes from the stopping jaw 1153, the first cam member 2001 is rotated while being guided along the cam surfaces and the elastic force of the first elastic member 551a, moving the first guide protrusion 1213 to where it can enter into the guide recess 1151. As reaching the position where it can enter into the guide recess 1151, the first cam member 2001 may be moved in the pop-up direction PU by the elastic force of the first elastic member 551a.

Figure 28:
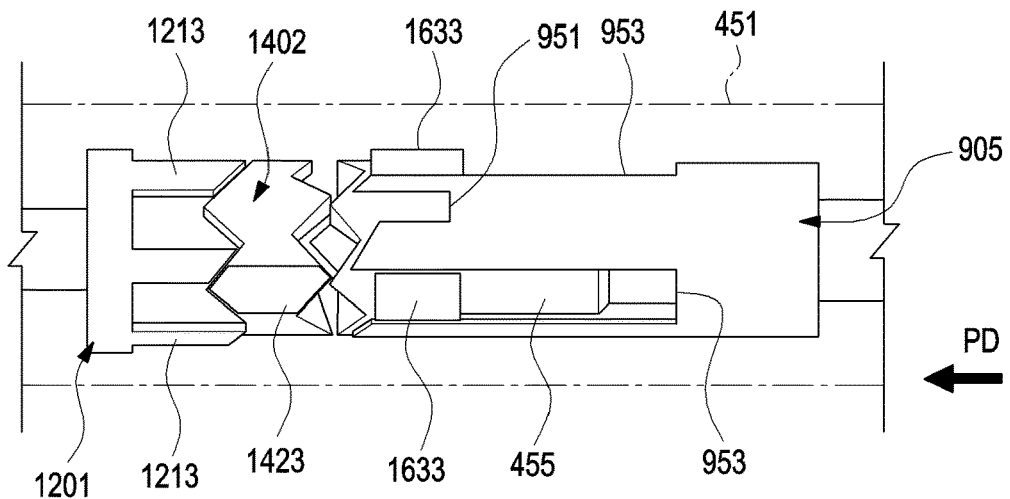
FIG. 28 and FIG. 29 are views illustrating a state in which a button member of an input device is pressed in another interval according to an embodiment.
Figure 29:
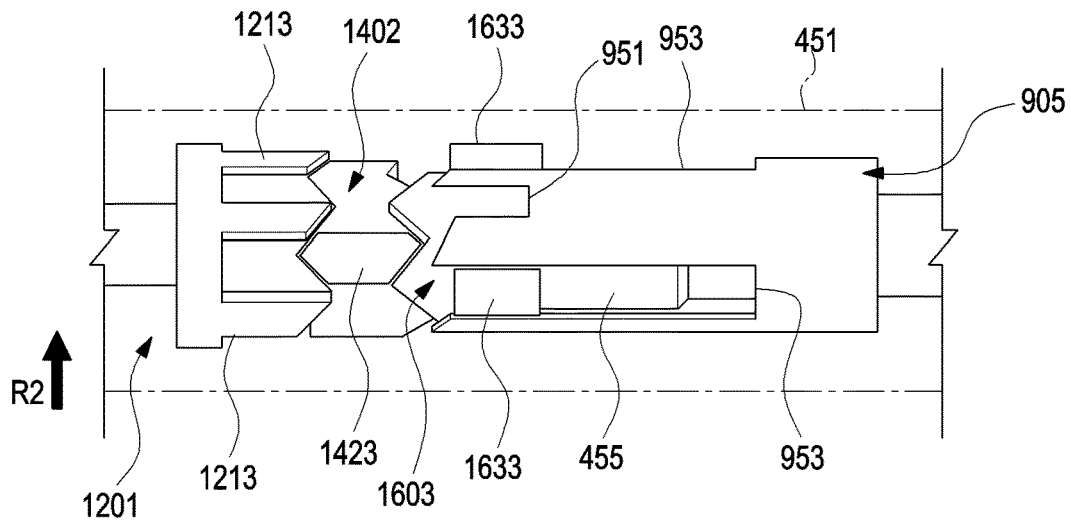
Figure 30:
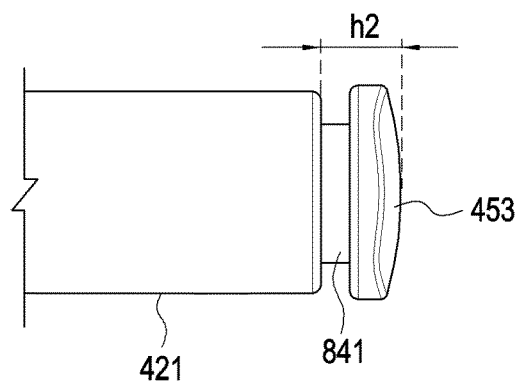
FIG. 30 is a view illustrating a position of a button member in the state shown in FIG. 29.

FIGS. 28 and 29 are views illustrating a state in which a button member of an input device is pressed in another interval according to an embodiment. FIG. 30 is a view illustrating a position of a button member in the state shown in FIG. 29.

Referring to FIGS. 28 and 29, the first cam member 1201 may pass where it escapes (or exits) from the first interval I1 and further move in the pop-down direction (PD). For example, when an external force steadily works on the button member 453, although the first cam member 1201 escapes from the first interval I1, the second cam member 1402 and the third cam member 1603 may be further moved in the pop-down direction (PD). As moving in the pop-down direction (PD), the second cam member 1402 may pass from the second interval I2 through the first interval I1 and linearly move and turn into a rotatable state in the position where the second guide protrusion 1423 escapes from the second guide recess 953 (hereinafter, a "second position"). For example, like when the first guide protrusion 1213 reaches the first position, when the second cam member 1402 or the second guide protrusion 1423 reaches the second position, the second cam member 1402 may be guided by the first elastic member 551a and the cam surfaces (e.g., the second cam surface 1425 of FIG. 14 and the third cam surface 1631 of FIG. 16) to be rotated in R2 direction while linearly moving in the pop-up direction PU. The position where the first guide protrusion 1213 escapes from the second guide recess 953 and the position where the second guide protrusion 1423 escapes from the second guide recess 953 are separated from each other in the description of the instant embodiment. However, the first position and the second position may be substantially the same as each other with respect to the guide structure 905 or the second guide recess 953.

According to an embodiment, the cam surfaces of the first cam member 1201 and the second cam member 1402 are engaged with each other in the first position. Thus, if the second cam member 1402 rotates in the second position, the first cam member 1201 may also rotate in R2 direction. As the second cam member 1402 is rotated while linearly moving, the cam surface (e.g., the second cam surface 1425 of FIG. 14) of the second cam member 1402 may collide with and tightly contact the cam surface (e.g., the third cam surface 1631 of FIG. 16) of the third cam member 1603, thus producing a second click feeling. The configuration of producing the second click feeling is similar to the occurrence of the first click feeling, and no detailed description thereof is thus given below. At the time of reaching the second position or producing the second click feeling, the sensor module (e.g., the sensor module 501 of FIG. 5) may produce a second input signal and transmit the second input signal to the electronic device (e.g., the electronic device 300 of FIG. 3). The configuration of producing or transmitting the second input signal to the electronic device may be similar to producing or transmitting the first input signal as described above and no detailed description thereof is presented.

According to an embodiment, when the second cam member 1402 reaches the second position and rotates, at least part of the second guide protrusion 1423 may be positioned to at least partially face the inclined surface 955 in the direction of linear motion of the shaft (e.g., the shaft 455 of FIG. 8) or the second cam member 1402. For example, when the external force applied to the button member 453 is removed, the cam members 1201, 1402, and 1603 may be moved in the pop-up direction PU by the first elastic member 551a but the second guide protrusion 1423 may be interfered with by the inclined surface 955 and stopped from entering into the second guide recess 953 while being guided and moved along the inclined surface 955. For example, when moved in the pop-up direction PU by the elastic force of the first elastic member 551a, the second cam member 1402 may be guided by the second guide protrusion 1423 and the inclined surface 955 to be rotated at a predetermined angle in R2 direction.

According to an embodiment, the second cam member 1402 may be rotated while moving in the pop-up direction PU up to the position where the second guide protrusion 1423 is aligned corresponding to the first guide recess 951. Although the second guide protrusion 1423 is aligned to the position corresponding to the first guide recess 951, the first guide recess 951 may limit entry of the second guide protrusion 1423. For example, since the first guide recess 951 has a first width (e.g., the first width w1 of FIG. 10), and the second guide protrusion 1423 has a second width (e.g., the second width w2 of FIG. 10) larger than the first width w1, the second guide protrusion 1423 may be restricted from entry into the first guide recess 951. For example, the first cam member 1201 and the second cam member 1402 may be positioned between the inclined surface 955 of the guide structure 905 and the first elastic member (e.g., the first elastic member 551a of FIG. 8), and the elastic force of the first elastic member 551a may not be substantially provided to the third cam member 1603.

The state in which the first cam member 1201 and the second cam member 1402 are positioned between the inclined surface 955 of the guide structure 905 and the first elastic member (e.g., the first elastic member 551a of FIG. 8) is described below further referring to FIGS. 31 and 32.

Figure 31:
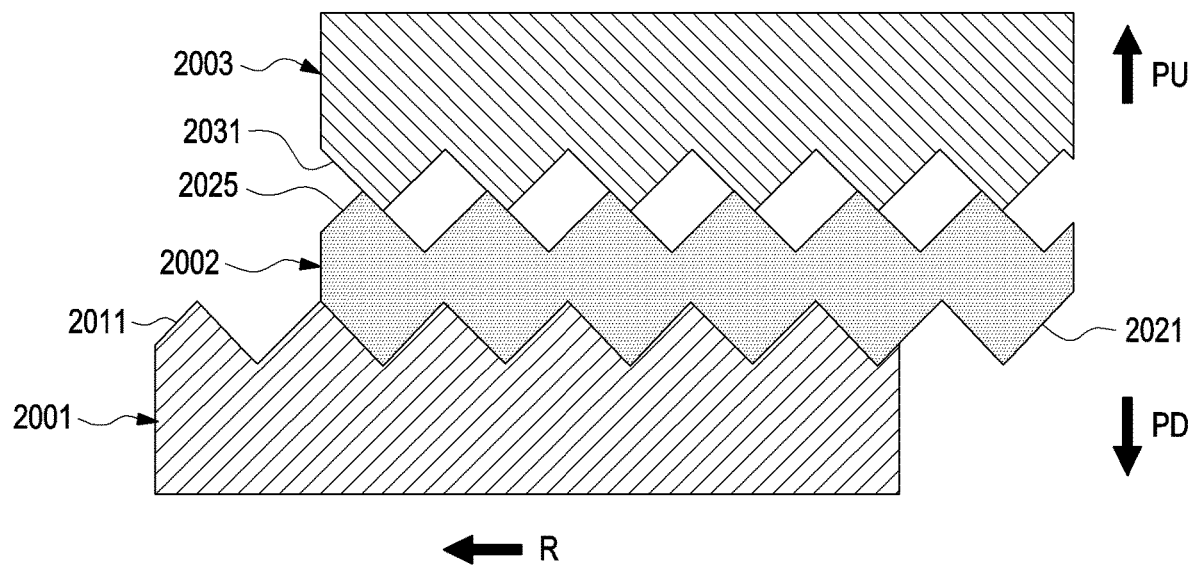
FIG. 31 and FIG. 32 are configuration views illustrating the operational relationship between cam members and a guide structure in the state shown in FIG. 29.
Figure 32:
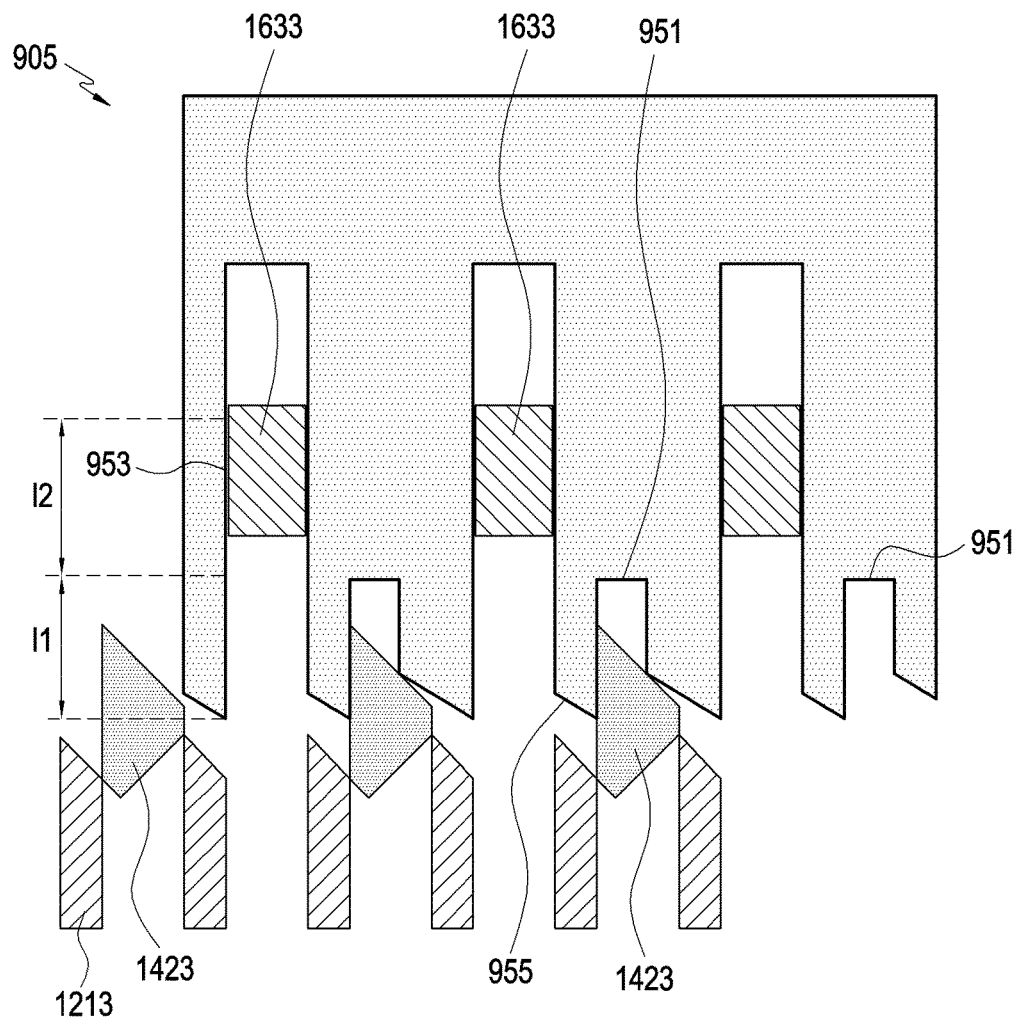

FIGS. 31 and 32 are configuration views illustrating the operational relationship between cam members and a guide structure 905 in the state shown in FIG. 29.

Further referring to FIGS. 31 and 32, in the state where both the first cam member 2001 and the second cam member 2002 (e.g., the first cam member 1201 and second cam member 1402 of FIG. 29) escape from the second guide recess 953 or the first interval I1, they may be rotated in R direction with respect to the guide structure 905 (e.g., the guide structure 905 of FIG. 29) or the third cam member 2003 (e.g., the third cam member 1603 of FIG. 29). Since the first cam member 2001 is rotated about the second cam member 2002 at the time of escaping from the first interval I1 so that the cam surfaces 2011 and 2021 tight contact each other, the cam surfaces 2011 and 2021 of the first cam member 2001 and the second cam member 2002 may be brought in tight contact with each other although the first cam member 2001 and the second cam member 2002 both are in the state of escaping from the first interval I1.

According to an embodiment, with the first cam member 2001 and the second cam member 2002 both escaping from the first interval I1, the second cam member 2002, along with the first cam member 2001, may be rotated in R direction while being guided by the inclined surface 955 up to the position where the second guide protrusion 1423 is aligned with the first guide recess 951. Since the elastic force of the first elastic member 551a works in the pop-up direction PU, the second cam member 2002 may be rotated to some degree in R direction while moving in the pop-up direction PU along the direction of extension of the inclined surface 955. Since the second guide protrusion 1423 has a larger width than the first guide recess 951, it may be restricted from entry into the first guide recess 951 although aligned with the first guide recess 951. Thus, in the state aligned with the first guide recess 951, the second guide protrusion 1423 may not move any further in the pop-up direction PU and be held stationary by the inclined surface 955 and the first elastic member 551a.

According to an embodiment, the second cam member 2002 rotates and moves, with the first cam member 2001 and the second cam member 2002 both escaping from the first interval I1, and thus, the cam surface 2025 (e.g., the second cam surface 1425 of FIG. 14) of the second cam member 2002 may be allowed to collide with and tightly contact the cam surface 2031 (e.g., the third cam surface 1631 of FIG. 16) of the third cam member 2003. At the time when the second cam member 2002 escapes from the second guide recess 953 or at the time when the cam surface 2025 of the second cam member 2002 collides with the cam surface 2031 of the third cam member 2003, the sensor module (e.g., the signal generating circuit unit 703 of FIG. 7) of the input device (e.g., the input device 400 of FIG. 4) may produce a second input signal, and the push-eject mechanism (e.g., the push-eject mechanism 405 or 800 of FIG. 4 or 8) may provide a second click feeling to the user.

According to an embodiment, since the second guide protrusion 1423 interferes with the inclined surface 955, with the second cam member 2002 escaping from the second guide recess 953, although the second cam member 2002 is moved by a limited distance in the pop-up direction PU, the elastic force of the first elastic member 551a may not substantially be exerted to the third cam member 2003. For example, the third cam member 2003 may have the propensity to receive an elastic force from the second elastic member (e.g., the second elastic member 851a of FIG. 8) and move in the pop-down direction (PD), with the second cam member 2002 escaping from the second guide recess 953. Since the third cam member 2003 is mounted to be linearly moved along with the shaft 455 and/or button member 453 of the push-eject mechanism (e.g., the push-eject mechanism 800 of FIG. 8), the button member 453 may substantially be held in the pop-down state (e.g., the state shown in FIG. 30).

According to an embodiment, in the pop-down state, the button member 453 may be projected from the first guide tube 421 as high as the second height h2. According to an embodiment, the second height h2 may be smaller than the above-mentioned first height (e.g., the first height h1 of FIG. 19) or the medium height (e.g., the medium height hm of FIG. 25). According to an embodiment, even in the pop-down state, a predetermined interval may be left between the first guide tube 421 and the button member 453 and, even in the pop-down state, the button member 453 may further be linearly moved in the pop-down direction. According to an embodiment, as the button member 453 further linearly moves in the pop-down direction (PD) in the pop-down state, the second cam member 2002 may be moved back to the second position, e.g., the position where it escapes from the second guide recess 953. The position where the second cam member 2002 escapes from the second guide recess 953 may substantially be the position where it escapes from interference with the structures forming the first guide recess 951.

According to an embodiment, as the second cam member 2002 escapes from interference with the structures forming the first guide recess 951, the second cam member 2002 may receive the elastic force of the first elastic member 551a while being guided along the cam surfaces 2025 and 2031 and may thus move in the pop-up direction PU while rotating in R direction. As the second cam member 2002 rotates, the second guide protrusion 1423 may be aligned with the second guide recess 953. When the second guide protrusion 1423 is aligned with the second guide recess 953, the elastic force of the first elastic member 551a may be transferred up to the third cam member 2003. For example, such an elastic force as is exerted substantially in the pop-up direction PU may be provided to the cam members 2001, 2002, and 2003, the shaft 455, or the button member 453, and the button member 453 may return to the pop-up position (e.g., the position shown in FIG. 19).

According to an embodiment, with the input device (e.g., the pen input device 120 of FIG. 3 or the input device 400 of FIG. 4) received in the electronic device (e.g., the electronic device 100 or 300 of FIG. 1 or 3), the button member 453 may be in the pop-down state, and the exposed portion of the button member 453 may substantially form a portion of a side surface (e.g., the side surface 110c of FIG. 1 or 2) of the electronic device 300. For example, according to an embodiment, the input device (e.g., the input device 400 of FIG. 4) may provide various forms of input signals to the electronic device 300 and may be received in the electronic device 300 and easy to carry. According to an embodiment, when the user pushes the button member 453, the button member 453 may return to the pop-up position as described above. For example, with the button member 453 returning to the pop-up position, the user may easily remove the input device 400 from the electronic device 100 or 300 using the button member 453.

Figure 33:
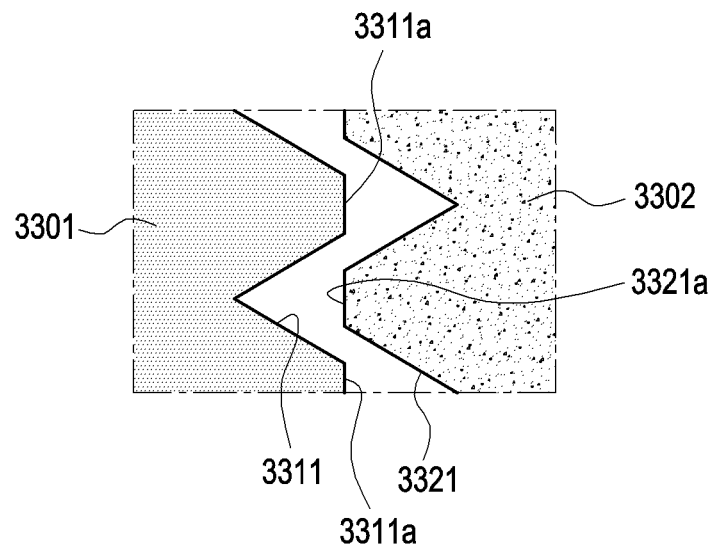
FIG. 33, FIG. 34, and FIG. 35 are views illustrating example modifications to the cam members of the input device according to an embodiment.
Figure 34:
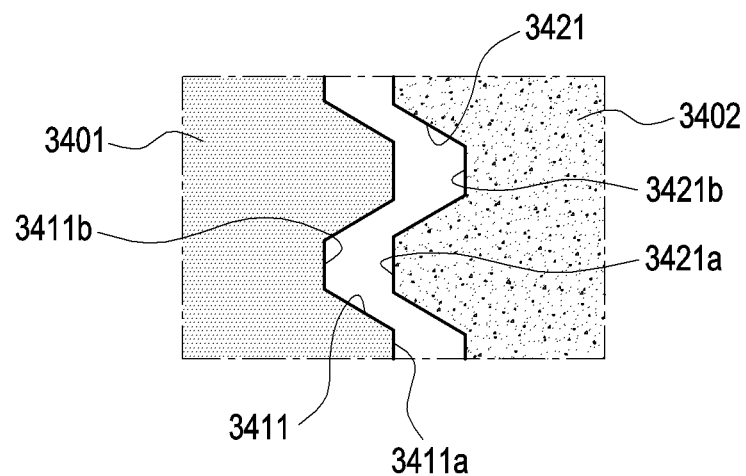
Figure 35:
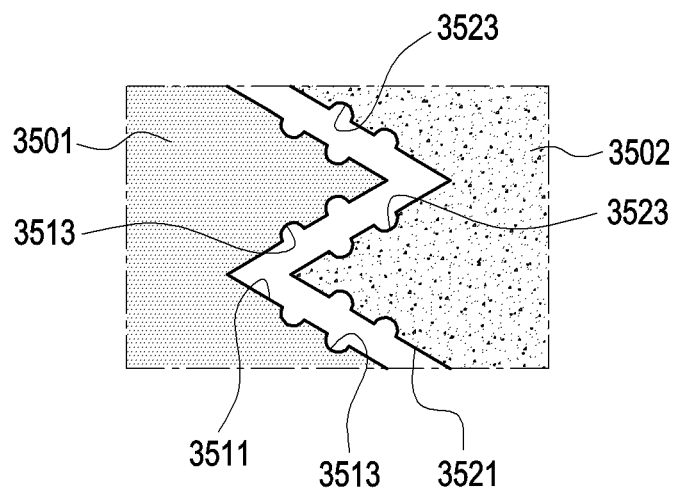

FIGS. 33, 34, and 35 are views illustrating example modifications to the cam members of the input device according to an embodiment.

Referring to FIGS. 33 to 35, the cam surfaces 3311, 3321, 3411, 3421, 3511, and 3521 of cam members 3301, 3302, 3401, 3402, 3501, and 3502 may come in various shapes. For example, as shown in FIGS. 33 and 34, the ridge portions or valley portions of two cam members 3301, 3302, 3401, and 3402 with their cam surfaces positioned to face each other may substantially be shaped as the letter "V" or flat surfaces 3311a, 3321a, 3411a, 3411b, 3421a, and 3421b perpendicular to the pop-up/pop-down direction of the button member or may be shaped in curves. According to an embodiment, as shown in FIG. 35, a plurality of holes 3513 and 3523 may be formed in the inclined surfaces (or curved surface) forming the cam surfaces 3511 and 3521. The shape of the cam surfaces may lead to diversified click feelings or collision sounds. For example, the shape of the cam surfaces facing each other of the first cam member 801 and the second cam member 802 of FIG. 8 may be rendered to differ from the shape of the cam surfaces facing each other of the second cam member 802 and the third cam member 803 so that different collision forces or sounds of click feelings may be provided when a first input signal is generated and when a second input signal is generated.

Figure 36:
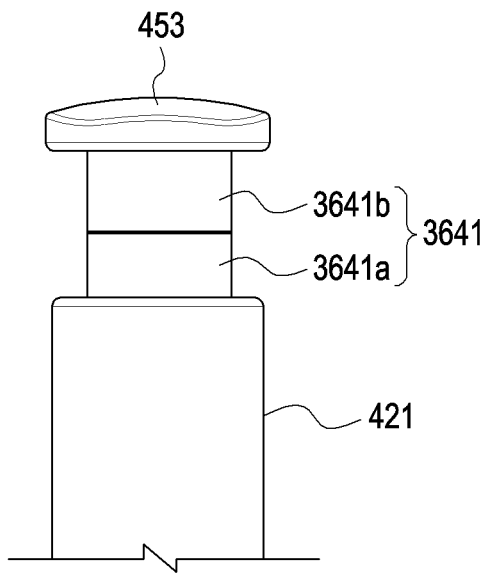
FIG. 36 and FIG. 37 are views illustrating example modifications to the button member of the input device according to an embodiment.
Figure 37:
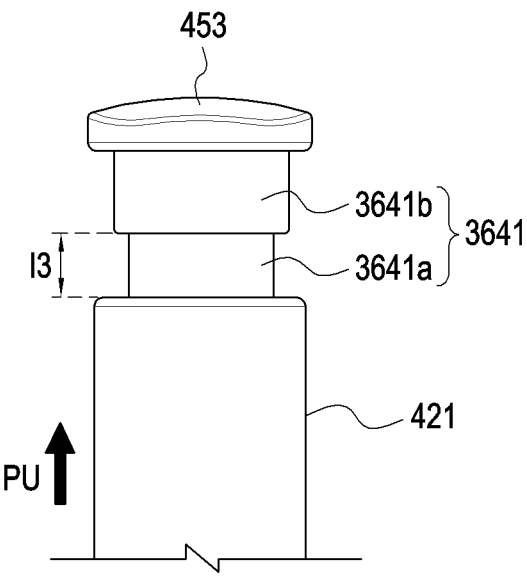

FIGS. 36 and 37 are views illustrating example modifications to the button member 453 of the input device according to an embodiment.

Referring to FIGS. 36 and 37, the connecting member 3641 (e.g., the connecting member 841 of FIG. 8) of the push-eject mechanism (e.g., the push-eject mechanism 800 of FIG. 8) may include a rotating portion 3641a with a circular cross section and an interfering portion 3641b with an elliptical cross section and the button member 453 may be assembled in the interfering portion 3641b or integrally formed with the interfering portion 3641b. According to an embodiment, the shorter diameter in the cross section of the interfering portion 3641b may be substantially the same as the diameter in the cross section of the rotating portion 3641a, and the longer diameter in the cross section of the interfering portion 3641b may be larger than the diameter in the cross section of the rotating portion 3641a. In the state aligned in the direction shown in FIG. 36, the button member 453 may be inserted or enter into the first guide tube 421 so that the interfering portion 3641b may be at least partially inserted into the first guide tube 421.

According to an embodiment, in the pop-up state shown in FIG. 37, the button member 453 may be rotated about the first guide tube 421 with respect to the rotational axis parallel to the pop-up direction PU, and part of the rotating portion 3641a may be positioned inside the first guide tube 421 to support rotation of the button member 453. When rotated to be placed in a different position from the aligned position shown in FIG. 36, e.g., to be aligned to the position shown in FIG. 37, the interfering portion 3641b may be restricted from entering into the first guide tube 421. In the pop-up state, a predetermined interval I3 may be formed between an end of the first guide tube 421 and the interfering portion 3641b, and the interval I3 may have substantially the same length as the above-described first interval (e.g., the first interval I1 of FIG. 21). According to an embodiment, in the aligned state shown in FIG. 37, the interfering portion 3641b may be interfered with by an end of the first guide tube 421 and thus prevented from entering into the inside of the first guide tube 421. For example, the button member 453 may be linearly moved back and forth by the interval I3 by the elastic force of the first elastic member 551a, and the input device (e.g., the input device 400 of FIG. 4) may repeatedly produce first input signals.

Figure 38:
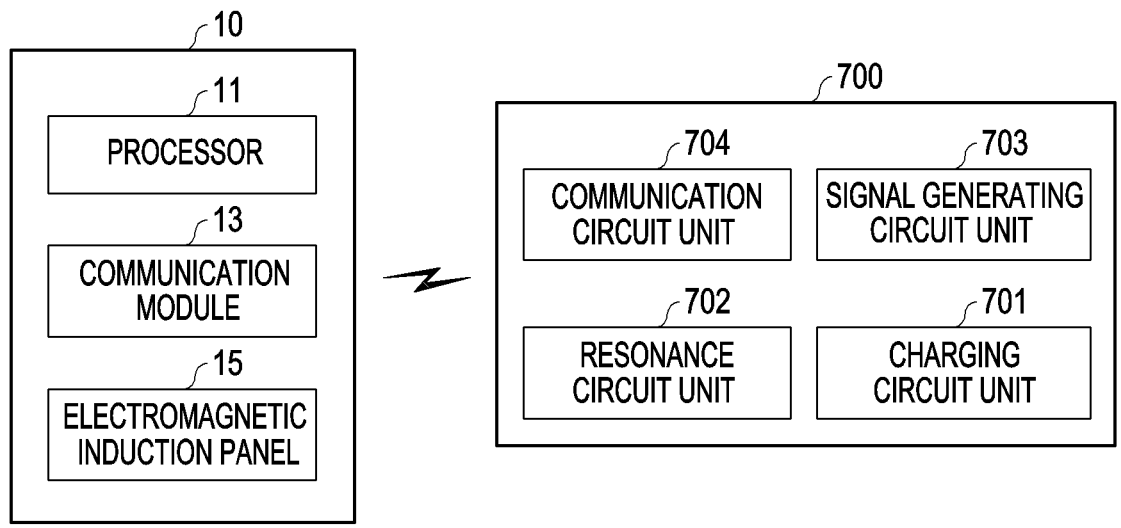
FIG. 38 is a block diagram illustrating a configuration of an electronic device including an input device according to an embodiment.

FIG. 38 is a block diagram illustrating a configuration of an electronic device 10 including an input device 700 according to an embodiment.

According to an embodiment, the electronic device 10 may include the whole or part of the electronic device 100 or 300 of FIGS. 1 to 3 and may include an input device (e.g., the input device 700 of FIG. 7). The electromagnetic induction panel 15 (e.g., the digitizer or electromagnetic induction panel 390 of FIG. 3) or communication module 13 of the electronic device 10 may perform communication with the input device 700 and detect input operations by the input device 700. According to an embodiment, with the input device 700 removed from a receiving hole (e.g., the hole 121 of FIG. 2) of the electronic device 10, the signal generating circuit unit 703, e.g., a sensor module (e.g., the sensor module 501 of FIG. 5), of the input device 700 may produce a first input signal or a second input signal according to the operation of the push-eject mechanism (e.g., the push-eject mechanism 800 of FIG. 8). The produced input signal may be transmitted through the transceiver 704 and may be received by the communication module 13 of the electronic device 10. The processor 11 of the electronic device 10 may perform at least one command or function based on the received input signal. The command or function corresponding to the received input signal may be stored in the memory (not shown). Communication between the communication module 13 of the electronic device 10 and the transceiver 704 of the input device 700 may be based on the Bluetooth protocol.

According to an embodiment, with the input device 700 removed from the receiving hole (e.g., the hole 121 of FIG. 2) of the electronic device 10, the electromagnetic induction panel 15 may detect a resonance frequency signal or electromagnetic field produced from the resonance circuit unit 702 of the input device 700 and detect the user's input operation. For example, the electromagnetic induction panel 15 may include a detection coil (not shown) to detect a signal or electromagnetic field produced by the resonance circuit unit 702.

According to an embodiment, the electronic device 10 may sense the state in which the input device 700 is received in the receiving hole of the electronic device 10. For example, since the resonance circuit unit 702 of the input device 700 is fastened in a predetermined position in the received state, the electromagnetic induction panel 15 or the processor 11 may determine that the input device 700 is in the received state based on the position of the resonance circuit unit 702. In the received state, the processor 11 may refrain from processing, e.g., input signals produced by the input device 700 or signals related to the user's input operation detected by the electromagnetic induction panel 15. For example, although a signal related to the input device 700 is produced in the received state, the electronic device 10 or the processor 11 may stop performing any function and may only process signals produced while the input device 700 stays out of the receiving hole.

According to an embodiment, in the received state, the electromagnetic induction panel 15 may function as a primary coil to wirelessly transmit power, and the resonance circuit unit 702 may function as a secondary coil to wirelessly receive power. For example, when recognized as the received state, the processor 11 may generate an electromagnetic field using the electromagnetic induction panel 15, and the charging circuit unit 701 may charge the battery (e.g., the battery 750 of FIG. 7) with, e.g., induced current generated from the resonance circuit unit 702 by the electromagnetic field.

As set forth above, according to an embodiment, an input device (e.g., the input device 400 of FIG. 4) of an electronic device comprises a guide tube (e.g., the first guide tube 421 and/or the second guide tube 451 of FIG. 4) extending in a direction, a shaft (e.g., the shaft 455 of FIG. 4 or 8) mounted to be able to linearly move back and forth in the direction inside the guide tube, a first cam member (e.g., the first cam member 801 of FIG. 8) rotatably mounted on the shaft inside the guide tube, being guided by the guide tube to linearly move along with the shaft in a first interval, and rotating or linearly moving about the shaft in a first position off the first interval to at least partially reenter into the first interval, a second cam member (e.g., the second cam member 802 of FIG. 8) rotatably mounted on the shaft inside the guide tube, able to linearly move in each of the first interval and a second interval connecting to the first interval and differing from the first interval, and rotating and moving about the shaft in the first position, a third cam member (e.g., the third cam member 803 of FIG. 8) mounted on the shaft while facing the first cam member with the second cam member disposed therebetween inside the guide tube and linearly moving back and forth along with the shaft, and a sensor module (e.g., the sensor module 501 of FIG. 5), wherein as the third cam member linearly moves back and forth, the first cam member and the second cam member each linearly move, and wherein the sensor module is configured to detect, at least, the first cam member reaching the first position to produce a first input signal.

According to an embodiment, the second cam member may rotate or linearly move about the shaft in the first position to at least partially escape from the first interval.

According to an embodiment, the first cam member escaping from the first interval may rotate to allow a cam surface of the first cam member to hit a cam surface of the second cam member to produce a first click feeling.

According to an embodiment, the second cam member may be moved from the second interval through the first interval to the first position by the linear movement of the third cam member, and rotate and linearly move about the shaft in the first position.

According to an embodiment, the sensor module may be configured to detect the second cam member reaching the first position and produce a second input signal.

According to an embodiment, the second cam member escaping from the first interval may rotate to allow a cam surface of the second cam member to hit a cam surface of the third cam member to produce a second click feeling.

According to an embodiment, the input device may further comprise a tube body (e.g., the tube body 411 of FIG. 4) coupled to one end of the guide tube. The sensor module may include a hall sensor (e.g., the hall sensor 543 of FIG. 5) mounted on the tube body and a magnet (e.g., the magnet 555a of FIG. 5) mounted on one end of the shaft. The hall sensor may be configured to detect a magnetic force or magnetic field of the magnet as the shaft linearly moves back and forth to produce, at least, the first input signal.

According to an embodiment, the magnet may be at least partially received in an inside of the tube body.

According to an embodiment, the input device may further comprise an electromagnetic resonance circuit (e.g., the resonance circuit unit 702 of FIG. 7) received in the tube body.

According to an embodiment, the input device may further comprise a button member (e.g., the button member 453 of FIG. 8) mounted on an opposite end of the shaft. When the first cam member is positioned in the first interval, and the second cam member is positioned in the second interval, the button member may project from an opposite end of the guide tube by a first height. When the first cam member and the second cam member escape from the first interval, the button member may project from the opposite end of the guide tube by a second height smaller than the first height.

According to an embodiment, the input device may further comprise a first elastic member (e.g., the first elastic member 551a of FIG. 8) supported by the first cam member to provide an elastic force in the direction of bringing the first cam member in tight contact with the second cam member and a second elastic member (e.g., the second elastic member 851a of FIG. 8) supported by the third cam member to provide an elastic force in the direction of bringing the third cam member in tight contact with the second cam member. The elastic force provided by the first elastic member may be larger than the elastic force provided by the second elastic member.

According to an embodiment, the guide tube may include first guide recesses (e.g., the first guide recesses 951 of FIG. 10) arrayed along a circumferential direction on an inner circumferential surface and extending along the direction and second guide recesses (e.g., the second guide recess 953 of FIG. 10) extending along the direction between the first guide recesses. The second guide recesses may extend to a length including, at least, the first interval and the second interval. The first guide recesses may extend to a length including, at least, the first interval and being smaller than the second guide recesses.

According to an embodiment, the input device may further comprise at least one first guide protrusion (e.g., the first guide protrusion 1213 of FIG. 12) formed on an outer circumferential surface of the first cam member and having a first width and at least one second guide protrusion (e.g., the second guide protrusion 1423 of FIG. 14) formed on an outer circumferential surface of the second cam member and having a second width larger than the first width. The first guide recesses may be formed to have a width to permit entry of the first guide protrusion while restricting entry of the second guide protrusion.

According to an embodiment, the guide tube may further include inclined surfaces (e.g., the inclined surfaces 955 of FIG. 10) connecting first ends of the second guide recesses with first ends of the first guide recesses on an inner circumferential surface. In the first position, the first cam member or the second cam member may be guided by the inclined surfaces to be rotated or linearly moved about the shaft.

According to an embodiment, the input device may further comprise a communication circuit unit (e.g., the transceiver 704 of FIG. 7) and a radiating conductor (e.g., the radiating conductor 443b of FIG. 4) electrically connected with the communication circuit unit. The communication circuit unit may be configured to transmit, through the radiating conductor, an input signal based on a signal produced by the sensor module.

According to an embodiment, an electronic device (e.g., the electronic device 100 or 300 of FIG. 1 or 3) comprises a housing (e.g., the housing 110 of FIG. 1) including a receiving hole (e.g., the hole 121 of FIG. 2) and the above-described input device (e.g., the input device 400 of FIG. 4). The input device may be inserted into or removed from the receiving hole along a lengthwise direction.

According to an embodiment, the electronic device may further comprise a communication module (e.g., the communication module 13 of FIG. 38) or an electromagnetic induction panel (e.g., the electromagnetic induction panel 15 of FIG. 38) disposed in the housing. The communication module or the electromagnetic induction panel may be configured to receive an input signal from the input device.

According to an embodiment, the communication module may be configured to perform Bluetooth communication.

According to an embodiment, the electronic device may further comprise a processor (e.g., the processor 11 of FIG. 38), a communication module, or an electromagnetic induction panel disposed in the housing. The electronic device may be configured to receive an input signal from the input device through the communication module or the electromagnetic induction panel. The processor may be configured to refrain from processing an input signal received when the input device is in the receiving hole while processing an input signal received when the input device is positioned outside the receiving hole.

According to an embodiment, the input device may further include a charging circuit (e.g., the charging circuit unit 701 of FIG. 7 or 38) and a battery (e.g., the battery 750 of FIG. 7). The input device may be configured to charge the battery with power received from the electronic device while being in the receiving hole.

As is apparent from the foregoing description, according to certain embodiments of the disclosure, the input device includes a push-eject type button structure using multiple cam members, thereby being able to implement various input operations through a single button. For example, the input device may produce various input signals in multimedia playing mode or capturing mode, leading to increased utility for electronic devices. According to an embodiment, the push-eject type button structure may be easily equipped in an elongate input device, e.g., a stylus pen or other pen input devices, and the pen input device may be utilized as a remote controller. For example, the input device may add more functions, contributing to expanding functionality or usability of electronic devices. According to an embodiment, the push-eject structure may be equipped in a pen input device, allowing it to be easily received in an electronic device.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

What is claimed is:

1. An input device of an electronic device, comprising:
   a guide tube extending in a direction;
   a shaft mounted to be able to linearly move back and forth in the direction inside the guide tube;
   a first cam member rotatably mounted on the shaft inside the guide tube, being guided by the guide tube to linearly move along with the shaft in a first interval, and configured to rotate or linearly move about the shaft in a first position off the first interval to at least partially reenter into the first interval;
   a second cam member rotatably mounted on the shaft inside the guide tube, configured to linearly move in each of the first interval and a second interval adjacent to the first interval and differing from the first interval, and configured to rotate and move about the shaft in the first position;
   a third cam member mounted on the shaft while facing the first cam member with the second cam member disposed the first cam member and the second cam member, the third cam member inside the guide tube and configured to linearly move back and forth along with the shaft; and
   a sensor module proximate to the first cam member,
   wherein as the third cam member linearly moves back and forth, the first cam member linearly moves and the second cam member linearly moves, and wherein the sensor module is configured to detect, at least, the first cam member reaching the first position to produce a first input signal.

2. The input device of claim 1, wherein the second cam member is configured to rotate or linearly move about the shaft in the first position to at least partially exit the first interval.

3. The input device of claim 1, wherein the first cam member is configured to rotate to allow a cam surface of the first cam member to make contact with a cam surface of the second cam member when exiting the first interval.

4. The input device of claim 1, wherein the second cam member is configured to move from the second interval through the first interval to the first position by linear movement of the third cam member, and is configured to rotate and linearly move about the shaft in the first position.

5. The input device of claim 4, wherein the sensor module is configured to detect the second cam member reaching the first position and produce a second input signal.

6. The input device of claim 4, wherein the second cam member is configured to rotate to allow a cam surface of the second cam member to make contact with a cam surface of the third cam member when exiting from the first interval.

7. The input device of claim 1, further comprising a tube body coupled to one end of the guide tube,
   wherein the sensor module includes a Hall sensor mounted on the tube body and a magnet mounted on one end of the shaft, and
   wherein the Hall sensor is configured to detect a magnetic force or magnetic field of the magnet as the shaft linearly moves back and forth to produce, at least, the first input signal.

8. The input device of claim 7, wherein the magnet is at least partially received inside of the tube body.

9. The input device of claim 7, further comprising an electromagnetic resonance circuit received in the tube body.

10. The input device of claim 1, further comprising a button member mounted on an opposite end of the shaft,
    wherein when the first cam member is positioned in the first interval, and the second cam member is positioned in the second interval, the button member projects from the opposite end of the guide tube by a first height, and
    wherein when the first cam member and the second cam member are positioned outside the first interval, the button member projects from the opposite end of the guide tube by a second height smaller than the first height.

11. The input device of claim 1, further comprising:
    a first elastic member positioned to provide an elastic force pushing the first cam member into tight contact with the second cam member; and
    a second elastic member positioned to provide an elastic force pushing the third cam member into tight contact with the second cam member, wherein the elastic force provided by the first elastic member is larger than the elastic force provided by the second elastic member.

12. The input device of claim 1, wherein the guide tube includes first guide recesses arrayed along a circumferential direction on an inner circumferential surface and extending along the direction and second guide recesses extending along the direction between the first guide recesses,
    wherein the second guide recesses extend to a length including, at least, the first interval and the second interval, and
    wherein the first guide recesses extend to a length including, at least, the first interval and being smaller than the second guide recesses.

13. The input device of claim 12, further comprising:
    at least one first guide protrusion formed on an outer circumferential surface of the first cam member and having a first width; and
    at least one second guide protrusion formed on an outer circumferential surface of the second cam member and having a second width larger than the first width,
    wherein the first guide recesses have a width to permit entry of the first guide protrusion while restricting entry of the second guide protrusion.

14. The input device of claim 12, wherein the guide tube further includes inclined surfaces connecting first ends of the second guide recesses with first ends of the first guide recesses on an inner circumferential surface, and
    wherein in the first position, the first cam member or the second cam member is guided by the inclined surfaces to be rotated or linearly moved about the shaft.

15. The input device of claim 1, further comprising:
    a transceiver; and
    a radiating conductor electrically connected with the transceiver,
    wherein the transceiver is configured to transmit, through the radiating conductor, a second input signal based on at the first input signal produced by the sensor module.

16. An electronic device, comprising:
    a housing including a receiving hole; and
    the input device of claim 1, wherein the input device is inserted into or removed from the receiving hole along a lengthwise direction.

17. The electronic device of claim 16, further comprising a communication module or an electromagnetic induction panel disposed in the housing,
wherein the communication module or the electromagnetic induction panel is configured to receive an input signal from the input device.

18. The electronic device of claim 17, wherein the communication module is configured to perform Bluetooth communication.

19. The electronic device of claim 16, further comprising a processor, a communication module, or an electromagnetic induction panel disposed in the housing,
wherein the electronic device is configured to receive an input signal from the input device through the communication module or the electromagnetic induction panel, and
wherein the processor is configured to refrain from processing an input signal received when the input device is in the receiving hole while processing an input signal received when the input device is positioned outside the receiving hole.

20. The electronic device of claim 16, wherein the input device further includes a charging circuit and a battery, and
wherein the input device is configured to charge the battery with power received from the electronic device while being in the receiving hole.

* * * * *